(12) United States Patent
Humpleman et al.

(10) Patent No.: US 6,603,488 B2
(45) Date of Patent: Aug. 5, 2003

(54) BROWSER BASED COMMAND AND CONTROL HOME NETWORK

(75) Inventors: Richard James Humpleman, Fremont, CA (US); G. Kevin Harms, San Jose, CA (US); Michael S. Deacon, San Jose, CA (US); Robert M. Wolff, Fremont, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/892,334

(22) Filed: Jun. 26, 2001

(65) Prior Publication Data

US 2001/0038392 A1 Nov. 8, 2001

Related U.S. Application Data

(62) Division of application No. 09/104,299, filed on Jun. 24, 1998, now Pat. No. 6,288,716.
(60) Provisional application No. 60/050,762, filed on Jun. 25, 1997, and provisional application No. 60/059,499, filed on Sep. 22, 1997.

(51) Int. Cl.$^7$ .............................. G06F 3/00; H04N 5/44
(52) U.S. Cl. ....................... 345/771; 345/169; 345/738; 345/740; 345/777; 348/734
(58) Field of Search ............................... 345/156, 169, 345/733, 737, 738–739, 740, 771, 773, 810, 835, 840, 853–854, 969–970; 348/734; 709/201, 203, 217

(56) References Cited

U.S. PATENT DOCUMENTS

| | | | | |
|---|---|---|---|---|
| 4,482,947 A | * | 11/1984 | Zato et al. | 348/734 X |
| 4,626,847 A | * | 12/1986 | Zato | 340/825.56 |
| 4,965,557 A | * | 10/1990 | Schepers et al. | 345/169 |
| 5,268,666 A | | 12/1993 | Michel et al. | |
| 5,367,316 A | * | 11/1994 | Ikezaki | 345/169 X |
| 5,410,326 A | * | 4/1995 | Goldstein | 348/734 |
| 5,519,878 A | | 5/1996 | Dolin, Jr. | |
| 5,570,085 A | | 10/1996 | Bertsch | |
| 5,636,211 A | | 6/1997 | Newlin et al. | |
| 5,657,221 A | | 8/1997 | Warman et al. | |
| 5,745,109 A | | 4/1998 | Nakano et al. | |
| 5,793,366 A | | 8/1998 | Mano et al. | |
| 5,883,621 A | * | 3/1999 | Iwamura | 345/719 X |
| 5,956,487 A | | 9/1999 | Venkatraman et al. | |

FOREIGN PATENT DOCUMENTS

EP        0637157 A2      7/1994

* cited by examiner

Primary Examiner—Raymond J. Bayerl
Assistant Examiner—X. L. Bautista
(74) Attorney, Agent, or Firm—Kenneth L. Sherman, Esq.; Sherman & Sherman; Jeffrey P. Aiello

(57) ABSTRACT

A method and system for commanding and controlling diverse home devices is provided. A first home device capable of displaying user interface data is connected to a home network. A second home device stores user interface data that defines a user interface for commanding and controlling the second home device, also connected to the home network. The first device receives the user interface data from the second device over the network. The first device then displays the user interface as defined by the data. The user interacts with the user interface displayed on the first device by a control device. User input is accepted from the user responsive to the interaction. Control and command information is sent from the first home device to the second home device in order to control the second device according to the user input. Since the user interface can be displayed from any device, a single control device may control a plurality of different devices without requiring any change in the mode of operation of the control device.

6 Claims, 19 Drawing Sheets

CLIENT 166

| APPLICATION LAYER | 152 |
| PRESENTATION LAYER | 154 |
| SESSION LAYER | 156 |
| TRANSPORT LAYER | 158 |
| NETWORK LAYER | 160 |
| DATA LINK LAYER | 162 |
| PHYSICAL LAYER | 164 |

SERVER 150

| APPLICATION LAYER | 152 |
| PRESENTATION LAYER | 154 |
| SESSION LAYER | 156 |
| TRANSPORT LAYER | 158 |
| NETWORK LAYER | 160 |
| DATA LINK LAYER | 162 |
| PHYSICAL LAYER | 164 |

FIG. 2

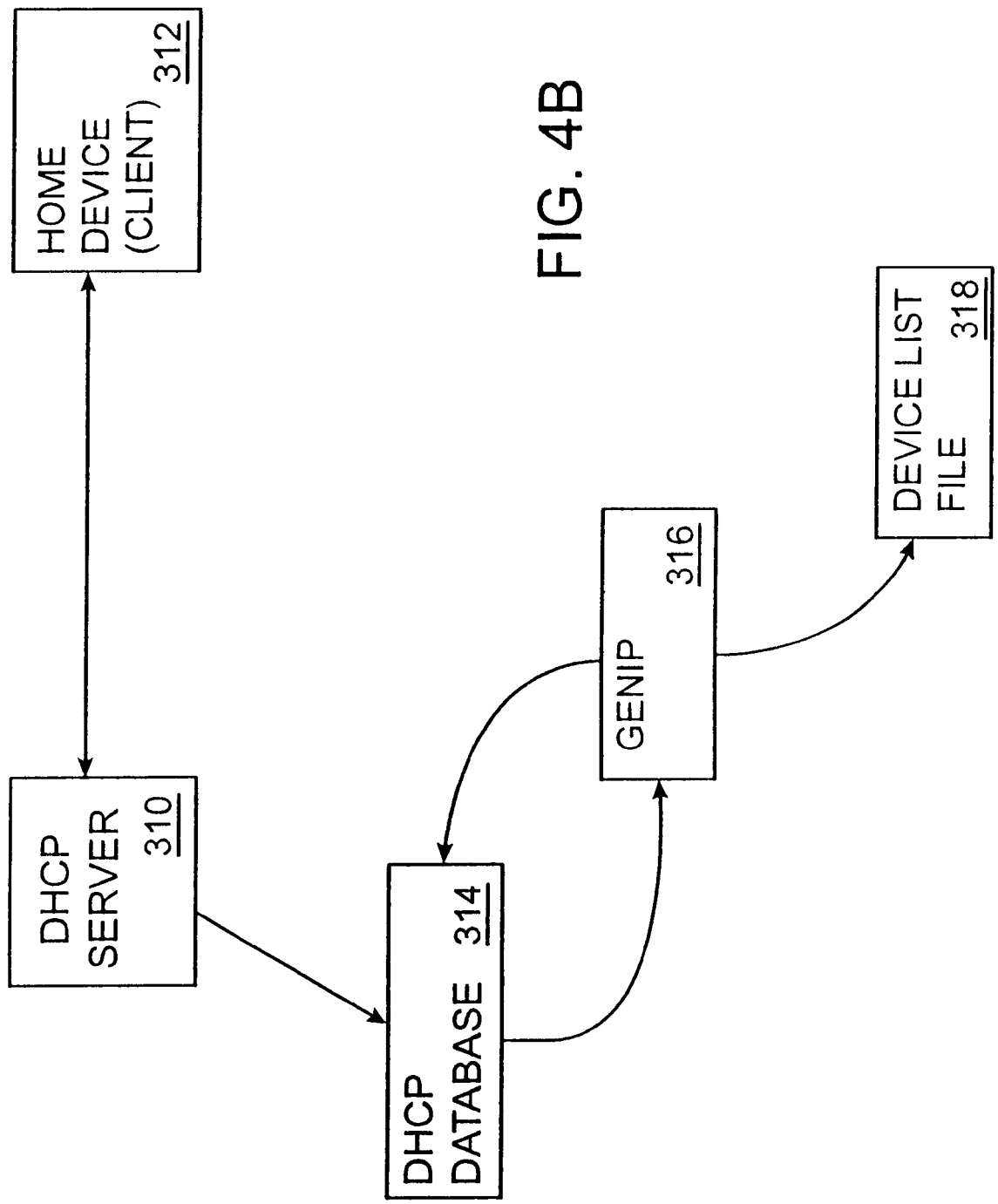

BROWSER BASED COMMAND AND CONTROL HOME NETWORK

CROSS-REFERENCES TO RELATED APPLICATIONS

"This application is a division of U.S. patent application, Ser. No. 09/104,299 filed Jun. 24, 1998, now U.S. Pat. No. 6,288,716 B1, which claims priority from U.S. Provisional Patent Application Serial No. 60/050,762 filed Jun. 25, 1997 now abandoned and U.S. Provisional Patent Application Ser. No. 60/059/499 filed Sep. 22, 1997 now abandoned.

This patent application claims priority from provisional patent application Serial No. 60/050,762, filed on Jun. 25, 1997, entitled Home Network, Browser Based, Command and Control and provisional patent application Serial No. 60/059,499, filed on Sep. 22, 1997, entitled Improved Home Network, Browser Based, Command and Control, which are incorporated herein by reference.

BACKGROUND OF THE INVENTION

1. Field of the Invention

The present invention relates to the field of networks, and more particularly, to browser based networks for controlling home devices.

2. Description of Related Art

A typical household contains several home devices. As used in this document, the term "home device" encompasses all electronic devices that are typically found in the home, with the exception of general purpose computers (i.e. personal computers (PCs), laptop computers, etc). For example, the term home device includes but is not limited to such electronic devices as security systems, theatre equipment (e.g., TVs, VCRs, stereo equipment, and direct broadcast satellite services or (DBSS), also known as digital satellite services (DSS)), sprinkler systems, lighting systems, micro waves, dish washers, ovens/stoves, and washers/dryers. Indeed, an automobile may be a home device. On the other hand, the term "device" as used in this document may comprise logical devices or other units having functionality and an ability to exchange data, and may include not only all home devices but also general purpose computers.

In general, home devices are used to perform tasks that enhance a homeowner's life style and standard of living. For example, a dishwasher performs the task of washing dirty dishes and relieves the homeowner of having to wash the dishes by hand. A VCR can record a TV program to allow a homeowner to watch a particular program at a later time. Security systems protect the homeowner's valuables and can reduce the homeowner's fear of unwanted entry.

Home devices (such as home theatre equipment) are often controlled using a single common control unit, namely a remote control device. This single common control unit allows a homeowner to control and command several different home devices using a single interface. Thus, many manufacturers have developed control units for controlling and commanding their home devices from a single interface.

One drawback associated with using the remote control unit to command and control home devices is that it provides static control and command logic for controlling and commanding each home device. Therefore, a particular remote control unit can only control and command those home devices for which it includes the necessary control and command logic. For example, if a remote control unit comprises logic for controlling a television (TV), a video cassette recorder (VCR), and a digital video device (DVD), but not a compact disk (CD) unit, the remote control unit can not be used to command and control the CD unit. In addition, as new home devices are developed, the remote control unit will not be able to control and command the new home devices that require control and command logic that was not known at the time the remote control unit was developed.

Another drawback associated with using a remote control unit is that it can typically only be used to command and control those home devices that are within the signal range of the remote control unit. Therefore, a user can not use the remote control unit from a single location in the house to control and command home devices that are connected, but located in separate parts of the home. For example, a VCR that is located upstairs in a bedroom may be connected with a TV that is downstairs in the family room. If a user wishes to play a tape contained in the VCR located upstairs in the bedroom, on the TV located downstairs in the family room, the user can not control and command both home devices from a single location.

Therefore, there is a need for a mechanism that dynamically provides for control and command of currently known home devices. Also there is a need for a mechanism that dynamically provides for the control and command of subsequently developed home device types. In addition, there is a need for a mechanism that provides for controlling and commanding, from a single location within the user's home, home devices that are connected but remotely located throughout the user's home.

SUMMARY OF THE INVENTION

It is accordingly an object of the invention to overcome the problems of the prior art, and to provide a method and apparatus for control of a plurality of devices.

It is a more specific object of the invention to provide method and apparatus for using a single control apparatus, with a single mode of operation, for controlling a plurality of devices without requiring any change in the mode of operation of the control apparatus to change the device being controlled thereby.

It is still a further object of the invention to provide a home network to implement one form of a method and apparatus for controlling a plurality of home devices connected thereto by a single control apparatus without requiring any change in the mode of operation of the control apparatus (as by changing codes generated by pushbuttons or keys thereof) to change the device being controlled thereby.

The present invention accordingly provides a method and system for implementing a home network for commanding and controlling home devices.

According to one aspect of the invention, a first home device that is capable of displaying user interface data is connected to the home network. A second home device that stores user interface data which defines a user interface for commanding and controlling the second home device, is also connected to the home network. The first home device receives the user interface data from the second home device over the home network. The first home device then displays the user interface as defined by the user interface data. User input is then accepted from a user in response to the user interacting with the user interface displayed on the first home device. Based on the user's input, control and command information is sent from the first home device to the second home device in order to control the second home device.

According to another aspect of the invention, the user interface data stored on the second home device is in the form of HTML page data.

According to another aspect of the invention, a configuration manager is also connected to the home network. When the first home device is connected to the home network, it signals the configuration manager that it is connected to the home network. The configuration manager maintains a list of the home devices that are currently connected to the home network.

According to another aspect of the invention, the home network is connected to the Internet.

According to another aspect of the invention, there is provided a home network system for commanding and controlling home devices. The home network includes a configuration manager, a first home device that contains user interface data which defines a user interface for commanding and controlling the first home device, a second home device having a viewable display unit that can be used to display the user interface for commanding and controlling the first home device, and an electrical bus that provides a communication medium that is used by the configuration manager, by the first home device and by the second home device to communicate with each other.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

FIG. 2 illustrates an example of a layered interface model that can be used for communicating between home devices in accordance with the present invention;

FIG. 4B depicts a flow diagram illustrating the generation of a device list file according to certain embodiments of the invention;

DESCRIPTION OF THE PREFERRED EMBODIMENTS

The following description is provided to enable any person skilled in the art to make and use the invention and sets forth the best modes presently contemplated by the inventors of carrying out their invention of a method and apparatus for controlling home devices over a home network. In the following description, for purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present inventions.

In an exemplary embodiment of the present invention, a browser based home network uses Internet technology to control and command home devices that are connected to a home network. Each home device contains interface data (e.g. HTML, XML, JAVA, JAVASCRIPT, GIF, JPEG, graphics files, or any other format useful for the intended purpose) that provides an interface for the commanding and controlling of the home device over the home network. In certain embodiments, each home device contains one or more Hypertext Markup Language (HTML) pages that provide for the commanding and controlling of the home device. Using the browser technology, the home network employs Internet standards to render the HTML pages in order to provide users with a plurality of graphical user interfaces ("GUIs") for commanding and controlling each home devices. In one embodiment, the home network is configured as an intranet.

Figure 1:
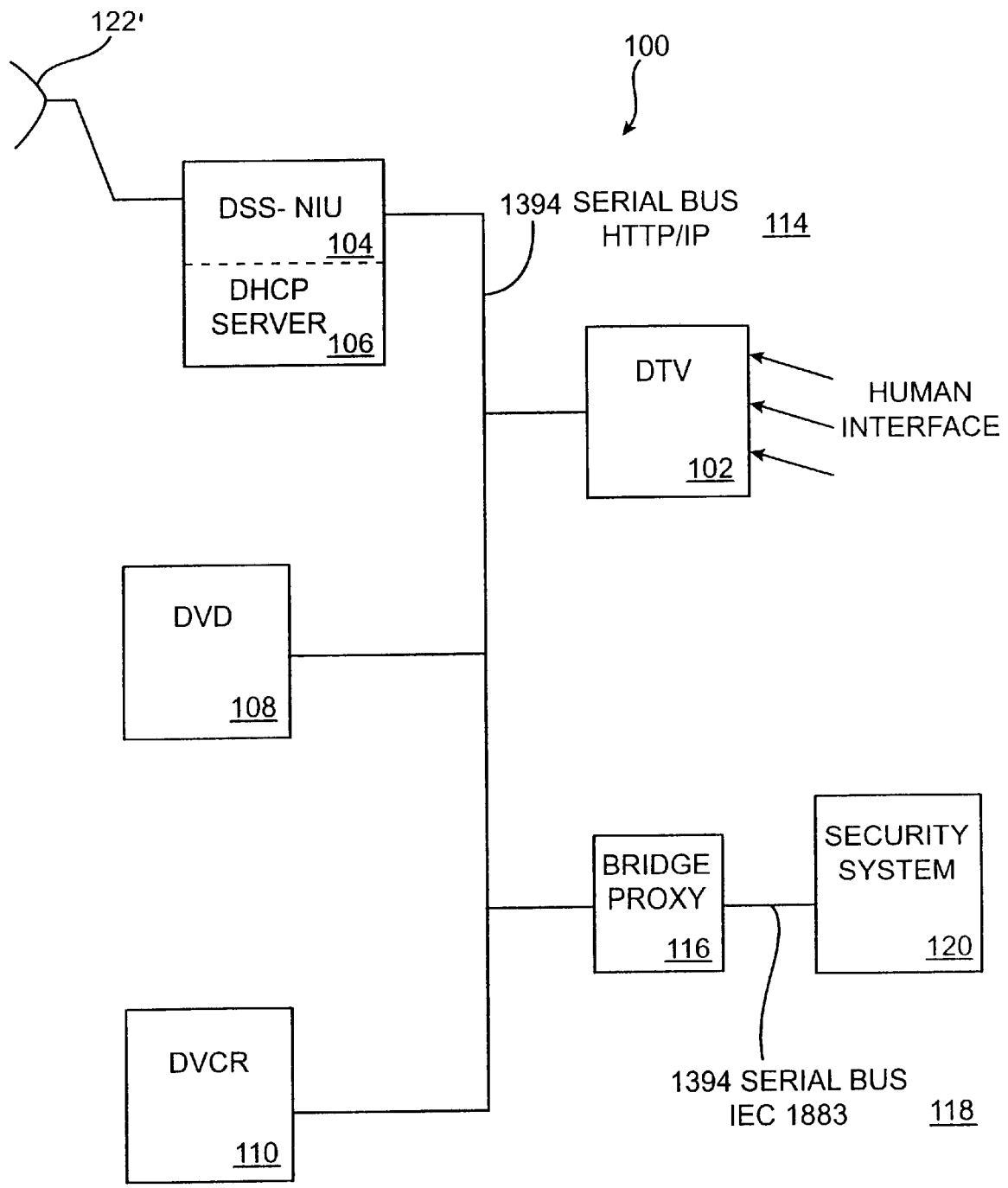
FIG. 1 is a block diagram of a home network constructed in accordance with the present invention.

FIG. 1 is a block diagram of a home network 100 constructed in accordance with one embodiment of the present invention. As depicted in FIG. 1, a 1394 serial bus 114 electronically connects multiple home devices on the home network 100. In this example, the 1394 serial bus 114 provides the physical layer (medium) for sending and receiving data between the various connected home devices. The 1394 serial bus 114 supports both time-multiplexed audio/video (A/V) streams and standard IP (Internet Protocol) communications. In certain embodiments, the home network uses an IP network layer as the communication layer for the home network 100. However, other communication protocols could be used to provide communication for the home network. For example, the invention may be implemented using FCP (Function Control Protocol) as defined by IEC 61883, or any other appropriate protocol. Thus, a network may generally include two or more devices interconnected by a physical layer for exchange or transfer of data in accordance with a predefined communication protocol.

FIG. 2 illustrates an example of a layered interface model that can be used for communicating between home devices in accordance with the present invention. In this example, a home device (server) 150 communicates with a home device client 166 using network communication layers 152–164. By employing the Internet Protocol standard for the network layer 160, the home devices can communicate with each other without having to know specific details about the other communication layers (i.e. application 152, presentation 154, session 156, transport 158, data link 162 and physical 164). Thus, by employing the Internet Protocol standard for the network layer 160, the home network may use a combination of different communication layers in communicating between different home devices. It should be recognized that a single physical package may include several devices which are logically networked via a network layer for example as shown in FIG. 2, not necessarily via a physical network. Such devices may include a VCR and a TV in a single housing, for example. Thus, for such an embodiment, where a logical device accesses a GUI to enable a user to control a home device, the home device and the logical device may be included in the same physical package. In such an embodiment, it could be considered that the physical device fetches a GUI from itself. However, in other embodiments the home network interconnects separate physical devices, wherein for example, a first device fetches a GUI from a second device, to permit user interaction with the GUI to control the second device.

By way of definition, it is contemplated that a "client" is a device providing control interface service to a human operator, including a graphical display hardware for down communication and a mouse or other point-and-click device for up (or return) communication. A "server" is contemplated as a module supplying a service, which may be any service other than a control interface provided by a client. Stated differently, the server/client relationship is a control relationship, wherein the server provides a service but a client-may use the data, as a DTV displays video data, but does not manipulate or alter the data. It is thus consistent with this definition to observe that, frequently, a server may be a source of information and a client (a browser, for example) may be a consumer of information.

Some specific functions which may be implemented by servers include: return of information (data); performance of a function (e.g., mechanical function) and return of status; return of a data stream and status; reception of a data stream and return of status; or saving of a state for subsequent action. Examples of servers include MPEG source, sink and display servers.

While a server typically includes a custom, built-in, control program to implement control of its own hardware, a client functions to interface with the server. It should be noted, however, that a "server" as used herein does not imply that a web server and a protocol stack must be used.

In a presently preferred embodiment, a 1394 serial bus is used as the physical layer 164 for the data communications on the home network 100. Because of its enhanced bandwidth capabilities, the 1394 serial bus can provide a single medium for all data communications on the home network 100 (i.e. audio/video streams and command/control). However, the home network 100 is not restricted to using a 1394 serial bus, and, in alternative embodiments of the present invention, other bus types, such as Ethernet, ATM, wireless, etc., may be used as the physical layer if they meet the particular throughput requirements of an individual home network.

As depicted in FIG. 1, the home network 100 has several home devices connected to the 1394 serial bus 114. In this example, the home devices include a DBSS 104 which receives transmission signals from a satellite 122 for subsequent display. Associated with the DBSS is a network interface unit ("NIU") which, among other things, provides an interface between the DBSS satellite transmissions and the 1394 serial bus 114.

A digital video device ("DVD") 108 is also connected to the exemplary home network 100. The DVD 108 can be used to display digitally encoded videos on a home television.

Also connected to the exemplary home network 100 is a digital video cassette recorder ("DVCR") 110, i.e., a digital VCR, and a digital TV 102.

In this example, the DTV 102 provides the human interface for the home network 100 by employing browser technology to allow users to control and command the home devices over the home network 100. Unlike most other home devices that are typically connected to a home network, the DTV 102 can provide the human interface for the home network 100 as it comprises a screen for displaying HTML pages. However other home devices having a display capability may be used to provide the human interface. Thus, in certain embodiments of the inventions, a device such as a personal computer ("PC") is used to provide the human interface for a respective home network, as a PC typically embodies a screen display unit.

Although the 1394 serial bus 114 is depicted as using the HTTP/IP interface protocol, certain home devices may require other protocols interface types (e.g. TCP/IP, UDP/IP, FTP/IP, TELNET/IP, SNMP/IP, DNS/IP, SMTP/IP). Therefore the HTTP/IP protocol may not be able to satisfy all home device connection requirements. Thus, in certain embodiments of the invention, a bridge proxy 116 is used to interface two networks using dissimilar interface protocols on their respective mediums which, when connected, comprise the home network 100. In certain embodiments, the two network mediums are of the same type. For example, as depicted in FIG. 1, the 1394 serial bus 114 using the HTTP/IP interface protocol is connected by a bridge proxy 116 to the 1394 serial bus 118, which uses the IEC61883 interface protocol. By using bridge proxy 116 to interface between the HTTP/IP and IEC61883 protocols, security system 120, which uses the IEC61883 interface protocol is also accessible on the home network 100.

In certain other embodiments, a home network may be comprised of two network mediums of dissimilar types, e.g., a 1394 Serial bus and Ethernet. Therefore, in certain embodiments of the invention, a bridge proxy is used to interface two dissimilar medium types to form a single home network.

The Dynamic Host Configuration Protocol (DHCP) server 106 is used for the discovery of home devices that are powered on and connected to the home network 100. The home device discovery process is described in greater detail below.

Home Network Overview

As depicted in FIG. 1, DTV 102, DVCR 110, DVD 108, DSS-NIU 104 and security system 120 represent home devices that are currently connected to the home network 100. A client-server relationship exists among the attached devices, with the DTV 102 typically behaving as the client and home devices DVCR 110, DVD 108, DSS-NIU 104 and security system 120 behaving as servers.

As previously mentioned, each home device is associated with one or more Hypertext Markup Language (HTML) files. The HTML files define the control and command functions associated with a particular home device. Each HTML file may also contain embedded references to other HTML files. The browser based DTV 102 (acting as a client), receives and interprets the HTML files associated with the home devices (acting as servers) and graphically displays the respective control and command information on its viewable display.

By conforming to the Hypertext Markup Language (HTML) and Hypertext Transfer Protocol (HTTP) Internet standards, each home device sends its custom GUI to the browser based DTV 102. The browser based DTV 102 receives the HTML files from the home devices over the home network 100 using the HTTP protocol. Each HTML file contains specific control and command information for a respective home device. The HTML files enable the browser based DTV 102 to graphically display control and command information to a user for a particular home device. Therefore, because each home device supplies its own GUI through its own HTML files to the browser based DTV 102, the browser based DTV 102 can provide a command and control interface for a home device without having to know any specific details about the particular device. This feature allows the home network 100 to contain home devices from a multitude of different manufacturers.

In addition, home devices can be transparently added or removed from the home network 100 without affecting the overall system as, in accordance with the invention, each home device defines its own command and control interface through its respective HTML files.

HTML Two Way Mechanism

Figure 3A:
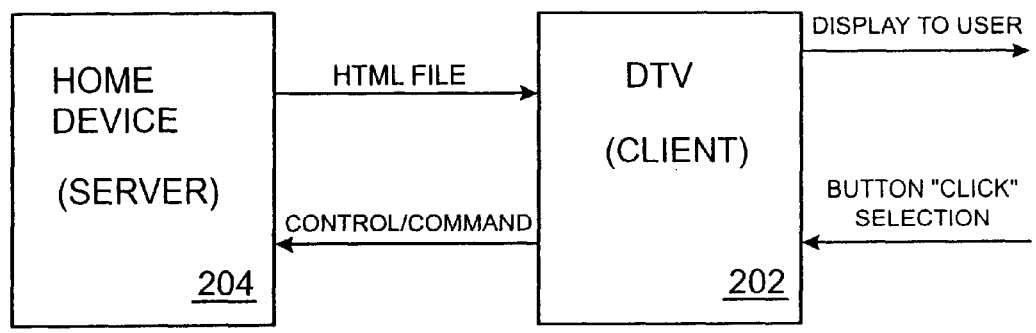
FIGS. 3A and 3B are block diagrams illustrating controlling and commanding of a home device using a browser based Digital TV (DTV) according to one embodiment of the present invention and a specific example.

FIG. 3A depicts an exemplary embodiment in which a browser based DTV 202 (client) renders the characteristics of a home device 204 (server) over a home network. The home device 204 is represented by one or more HTML files stored in an accessible area within the home device 204. The one or more HTML files are ASCII text files containing specific information pertaining to the particular home device 204, along with data that enables a browser to present the information graphically. In addition to rendering the HTML file on the browser based DTV 202, by employing forms technology, the browser based DTV 202 can return information back to the home device 204, thus providing a two-way communication. Other common techniques for providing the two-way communication may include the use of Java or Control Gate Interfaces (CGIs). Once the information contained in a device's HTML file is graphically displayed on the DTV 202, the user can control the home device 204 from the DTV 202 by selecting icons that have associated hyperlinks to start the control programs displayed on the DTV's screen and/or entering data to the DTV 202.

Home Device HTML Files

As previously stated, each home device connected to the home network has one or more associated HTML files. The HTML files for a respective home device define the control and command functions for that particular home device. Each HTML file may also contain embedded references to other related HTML files. A device connected to the home network that has a viewable display (e.g., screen) and employs the browser technology may receive and interpret the HTML files associated with the home devices connected to the home network, and graphically display the information contained therein using a GUI on its screen.

This is illustrated by FIG. 3A wherein is shown an interaction between a client and a server's executables. However, it is a feature of the invention to provide control by interaction between executables of two servers or of a client and plural servers. Thus, in accordance with the invention control is typically implemented by service control programs (executables which are trying to be operated remotely), communications, commands and (if necessary), human interface with a server control program via a GUI.

Figure 3B:
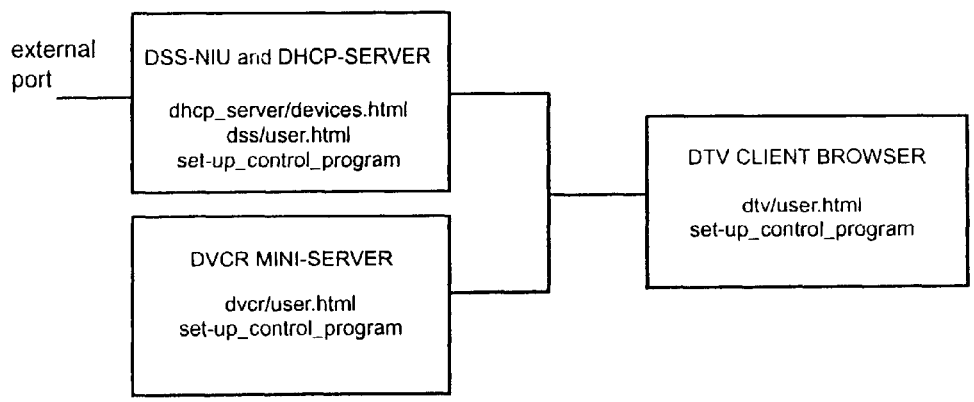

As one example, FIG. 3B shows location of file and program components locally, permitting control actions to be implemented by running programs and scripts on the device itself. This aspect of the invention thus permits implementation to be carried out in a local manner which may be proprietary to the device rather than being performed remotely, and which thus does not require a standardized 1394 command set.

For example, the user may wish to change display brightness. To implement such a change, the user may click on a "Brightness" button on the User HTML GUI page. In response, another GUI may be brought up, with "Bright" and "Dim" buttons. In response to the user clicking one of these two buttons, the http server will cause a brightness control program for the display to run, in order to control the desired hardware action. For action local to the DTV, the DTV thus may include a server capability, to interpret the post actions from the browser.

In that regard, in order to be able to post actions to control their local hardware, all home network DTV devices preferably have a server capability. For such operation, a browser may pick up local html files and render the files to a GUI, without invoking the http server. In order to invoke the local http server to respond, clicking on a button preferably involves an http access to the local machine name or IP address. In turn, the http server invokes the local device control program, such as "Brightness" in the above example.

Generally, control may be implemented by transfer of a graphical control object (GCO), which preferably resides in the server, from the server for rendering on the client, to make the GUI. As an advantageous result of this approach, detailed controls back to the server originating the GCO may be proprietary, as the server device "understands" and is aware of its own GUI controls. Additionally, the look and feel of the GUI originates with the attached server (e.g., the program server, server device or media) and not with the client. Independence of the command language makes the arrangement operable independently of any new features added to devices, which may be included in the GCO sent from the server, as well as any other future modifications, i.e., the home network configuration is made inherently "new-feature proof" and "future proof".

Moreover, because a specific device may be selected for control by selecting an icon, there is no need for hardware reconfiguration to implement control of different (or updated) devices. Accordingly, a single command set may be used in a remote control for controlling plural (different) devices, by communicating with the client device rendering of the GUI.

For server to server control without a GUI and user involvement, automatic operation may be initiated or set-up by user control via a client, but later action is implemented by control language interaction between servers without involving a client.

In order to implement the foregoing, a server operating in accordance with the invention preferably has one or more control programs for executing a required service. The server, which stores its GCO, provides the GCO to a client and a GUI rendered on the client interfaces with the server control program(s) executable(s). Moreover, the server control program is able to save the state which has been controlled by the GUI, such as setting up a timer record action for example. The server also may include a clock for implementing various timer operations. The client is thus not required to have any knowledge of the server device being controlled, and it is not necessary to provide the client with the ability to save a previously controlled state. Indeed, as elsewhere described herein, the client may not be running for part of the time in which the server is running. Thus, preferably the server does not rely on another device, such as the client, for its operation and may serve multiple clients simultaneously.

A client, which receives GCO transfers from one or more servers, includes a GUI renderer to form the GUI from a received GCO. It is within the scope of the invention for a limited number of GCO's, for a limited number of servers, to reside in the client. However, for the inventive configuration of a home network, the large number of different server types presently in existence and contemplated for the future demonstrates the advantage arising from the GCO's residing on the servers, thus freeing the client from a requirement for any built-in knowledge of the server(s) being controlled.

In operation, during initial selection of the device, the GCO is fetched and rendered by the client, to form the GUI and enable actions and responses to be communicated between the GUI and the control program(s) of the client(s).

For server-server control, a command language interface and library of commands may be provided in a server. For any individual server, it is not necessary to provide the entire command language. Instead, a server should only be able to support those commands which it needs to send and receive to perform its functions. It is a simpler task to provide such a configuration than to build in the command language interface and library to a client for controlling all present and future servers.

In addition to the one or more HTML files stored therein, each home device connected to a home network contains a Properties file. In one embodiment, the Properties file for a respective home device comprises the device manufacturer's name, the device name, the device type, the device model, and the Uniform Resource Locator ("URL") of the device manufacturer's HTML page. The top-level page associated with each home device may be called the device/default.HTML file.

Each home device connected to the home network also contains a LOGO image file. A LOGO image file for a respective home device is a file containing an image that represents the manufacturer of the device. In one embodiment, the LOGO image file for a particular home device contains an image with the name and logo of the manufacturer of the home device.

In the following description, a software agent which assists the user in interacting with the network and controlling the various home devices connected to the network, and thus acts as the primary interface between the user and the home network, is called a session manager. For example, the software agent for the user (i.e., the session manager) may access the devices to get more information for the user, in order to assist the user with making selections associated with the devices, or with managing the devices. Such assistance with control of a device may include modifying the GUI display for that device, as by graying out some buttons, thus inhibiting selection of various options (or devices) based on prior selections and capabilities of devices. Still further, the session manager, acting as the user's agent, may link two or more devices selected by the user and may set up a communication path therebetween, freeing the user from the tedium and detail of implementing such control functions.

In certain embodiments, in order for a session manager to properly locate the LOGO image file of a respective home device, all home devices connected to the home network use a standard filename for the particular LOGO image file to be displayed. In one embodiment, each home device names its respective LOGO image file that is to be displayed LOGO.GIF.

In certain embodiments, a LOGO image file for a respective home device is of a standard size, e.g. 120×40 pixels. A standard size ensures that the device logos have a neat, uniform look when depicted in the GUI displayed to the user. In certain embodiments, the image of the LOGO image file may also be animated.

In certain embodiments, multiple versions of the LOGO image file may reside on a respective home device, with the home device responsible for determining which version is ultimately displayed to the user. The home device may update the version to be displayed to the user over time, based on criteria of the device manufacturer's choosing.

Each home device connected to a home network also contains an ICON image file. An ICON image file for a respective home device is a file containing an image that represents the is particular type of home device; e.g., a DTV or a DVCR. In certain embodiments, the ICON image file contains an image of the device or a symbol that represents the type of device. A manufacturer model number may be included at the bottom of the image in the ICON image file, to assist in identification of the home device on the home network.

In certain embodiments, several variations of the ICON image file reside on a respective home device, with each ICON variation representing a particular state of the home device. For example, for a DVCR, the ICON image files may contain images of a DVCR playing, rewinding, media inserted, media absent, etc.

To represent the various device state images, the manufacturer may use a variety of symbols, colors and animation. The home device is responsible for determining which ICON image version is to be displayed to the user, based on the device's representative state at any particular time. This allows the ICON image file for a respective home device to provide feedback to the user as to the particular state of the home device.

In certain embodiments, an ICON image file for a respective home device is of a standard size, e.g., 120×90 pixels. A standard size ensures that the device images will have a neat, uniform look when depicted in the GUI displayed to the user. In one embodiment, in order for a session manager to properly locate the ICON image file of a respective home device to be displayed, all home devices connected to the home network use a standard ICON image filename for the respective ICON image file to be displayed. Each home device may name its respective ICON image file to be displayed ICON.GIF.

As previously stated, each home device connected to the home network has one or more HTML files associated with it. One of these HTML files is a home, or base page, file for the particular home device. To aid in the access of a particular home device's home page, in certain embodiments, each home device uses a standard home page filename. In one embodiment, each home device names its respective home page file USER.HTML.

Home Device Discovery Process

Communication on the home network is provided through the use of the Transmission Control Protocol/Internet Protocol (TCP/IP) standard network protocols. The TCP layer provides a reliable delivery mechanism while the IP layer provides a routable addressing mechanism for packets of data on the home network 100. In the home device discovery process, each home device is associated with a unique IP address and a logical name, which are used to identify a particular home device connected to the home network. To associate each home device with a unique IP address and logical name pair, a configuration manager is provided that dynamically allocates a unique IP address and logical name for each home device that becomes available on the home network. An available home device is a home device that is both powered-on and connected to the home network.

The IP address and logical name pairs of the available home devices are stored in a device list file within the configuration manager. The device list file is dynamically updated as home devices are added and removed from the home network 100 (i.e., become available and non-available on the home network 100).

By using the configuration manager to allocate unique IP addresses for each home device, device manufacturers are relieved from having to associate a predefined IP address with each home device. However, in certain embodiments of the invention, when a particular home device is associated with a predefined IP address, the configuration manager uses the predefined IP address as the home device's unique IP address on the home network 100.

In one embodiment of the invention, a dynamic host configuration protocol ("DHCP") server 106 of FIG. 1 performs the functions of a configuration manager for a home network 100. The DHCP is a current industry standard and, for a particular home network, multiple home devices may be capable of performing the necessary DHCP server 106 functions. However, although multiple home devices may be capable of functioning as the DHCP server 106, in a presently preferred embodiment, the home device that is of the device type least likely to be duplicated on the home network 100 (i.e., least likely to have more than one of its home device types resident on the home network 100) is nominated to function as the DHCP server 106. In the exemplary home network 100 of FIG. 1, the DSS 104 is nominated to be the DHCP server 106 for the home network 100 as it is least likely to be duplicated on the network 100.

The DHCP server 106 on the home network 100 generates a unique IP address and, for each home device that is available on the home network 100, retrieves a logical name pair from the device. In certain embodiments, if an individual home device on the home network 100 has a predefined IP address already associated with it, the DHCP server 106 uses the predefined IP address as the unique IP address from that home device. The DHCP server 106 causes the IP address and logical name pairs associated with the available home devices to be stored within a device list file. The device list file is dynamically updated as home devices are added and removed from the home network 100.

In certain configurations, a plurality of home devices with DHCP server capabilities may exist on a single home network. Therefore, in certain embodiments, an arbitration protocol is employed to select and designate a particular home device to function as the DHCP server for the home network. In another embodiment, a communication protocol is employed between the various home devices with DHCP server capabilities that are present on a home network, resulting in a single designated DHCP server for the home network.

Figure 4A:
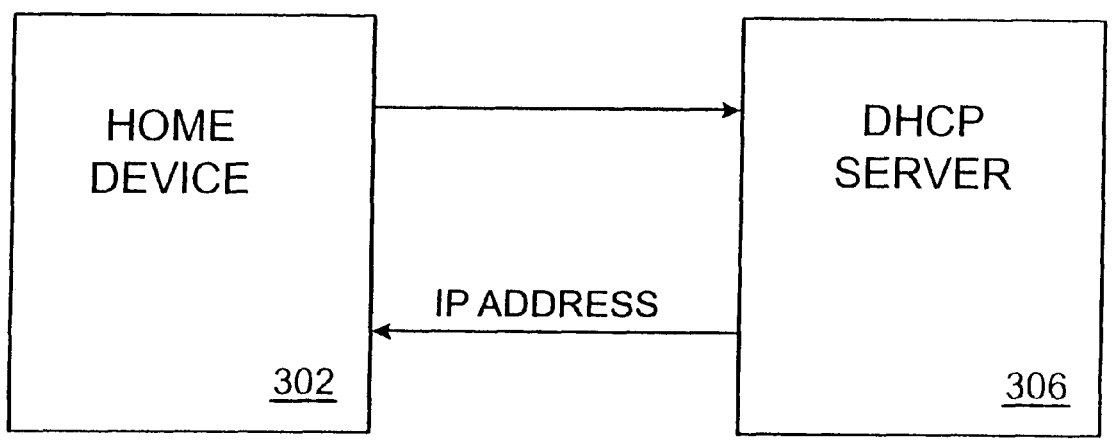
FIG. 4A is a block diagram illustrating a home device discovery mechanism according to one embodiment of the invention.

FIG. 4A is a block diagram illustrating a home device discovery process according to an embodiment of the invention. When a home device 302 that is connected to the home network is powered on, the home device 302 broadcasts its presence over the home network in order to extract its configuration from the DHCP server 306. Upon receiving the broadcast, the DHCP server 306 generates a unique IP address and a logical name to be associated with the home device 302. After generating the unique IP address and looking up the logical name pair, the DHCP server 306 returns the IP address and logical name pair to the home device 302. The unique IP address is then used for communicating with the home device 302 over the home network. In addition to sending the IP address and logical name pair to the home device 302, the DHCP server 306 stores the generated IP address and logical name pair within the device list file. This discovery process is repeated for each home device that is powered on and connected to the home network. Thus, the DHCP server 306 provides for the dynamic allocation of IP address and logical name pairs for configuring newly attached and powered on home devices.

FIG. 3A depicts a flow diagram illustrating the generation of a device list file 318 according to certain embodiments of the invention. In this example, a DHCP Server 310 communicates with a home device 312 that is accessible on the home network in order to generate a unique IP address and logical name for the home device 312. The DHCP Server 310 stores this information in the DHCP database 314. As home devices become available/non-available on the home network, the information in the DHCP database 314 is continually updated in the manner described below.

GENIP is a Win32 console-based application which interacts with external programs, databases (indirectly) and device/session managers. The core interaction is an indirect contact with the standard DHCP Server product which is part of the standard Windows NT Server package, through a program known as DHCPCMD.exe, which is part of the NT Server Resource kit found on MSDN developer DCROM sets. In operation, DHCPCMD.exe interacts with the external programs and databases via a command "enumclients", which creates a listing of all the current database of DHCP clients. Thus, GENIP runs the DHCPCMD utility and generates an internal "current" database of IP leases active in the DHCP database from the output of the DHCPCMD utility.

The GENIP process 316 of FIG. 4B periodically reads the device information contained in the DHCP database 314 and compares it with the device information currently contained in the device list file 318. By comparing the information the GENIP 316 can determine if a home device has been added or removed from the home network. More specifically, the "current" database is compared item-for-item against the previously read database and, if any differences are found, a database update is performed thereby providing detection of any newly connected devices on the home network.

In one embodiment, if the device information contained in the DHCP database 314 differs from the device information contained in the device list file 318, the GENIP process 316 signals a process to update a device link page and repaint a client display. The device link page is described in greater detail below.

ReadDHCPDB( ) is the workhorse of GENIP, handling the setup and execution of DHCPCMD as well s reading the resultant output therefrom, reading the same into the "current" database, comparing with the "previous" database, and then writing a new "output" database for the clients.

By default, GENIP operates on the DHCP database every 3 seconds, and it is thus advantageous to have GENIP running on the same physical machine as the DHCP server itself. Similarly, as the device and/or session managers will be accessing the output database frequently as well, the output file should be placed in a directory which is sharedout by the server and to which the clients have access. Although this requires agreement by the clients on where the output database is stored, this feature of the protocol may be improved upon by providing a protocol which both is non-polling for the events and also does not require manual configuration.

For example, instead of writing to a file, the UpdateDB( ) member of GENIP may prepare a network packet which could be broadcast into the subnet of interest, the packet containing instructions for the client on how and where to get the latest database information. This may be simply implemented by using the http protocol, placed on an unused port such as 8080 for example, so that the broadcast message would contain http://server_ip_address:8080/network_db.txt. The "network_db.txt" portion of the message would not be used if the only use for port 8080 is the network database. For improved future capability and expansion purposes, other information would be allowed to be transmitted via this same http port, and an actual full URL is provided.

Auto-Tree Builder

In one embodiment of the invention, an auto-tree builder uses the contents of the device list file of a home network in order to generate a device link page. The device link page is displayed to the user on the screen of a browser based home device. The device link page contains a home device button for each home device identified in the device list file. Each home device button in the device link page is associated with a hypertext link (hyperlink) to the top-level page of the respective home device. If a user selects a particular home device button contained in the device link page, the respective device's home page is subsequently displayed to the user on the browser based home device's screen.

Figure 5A:
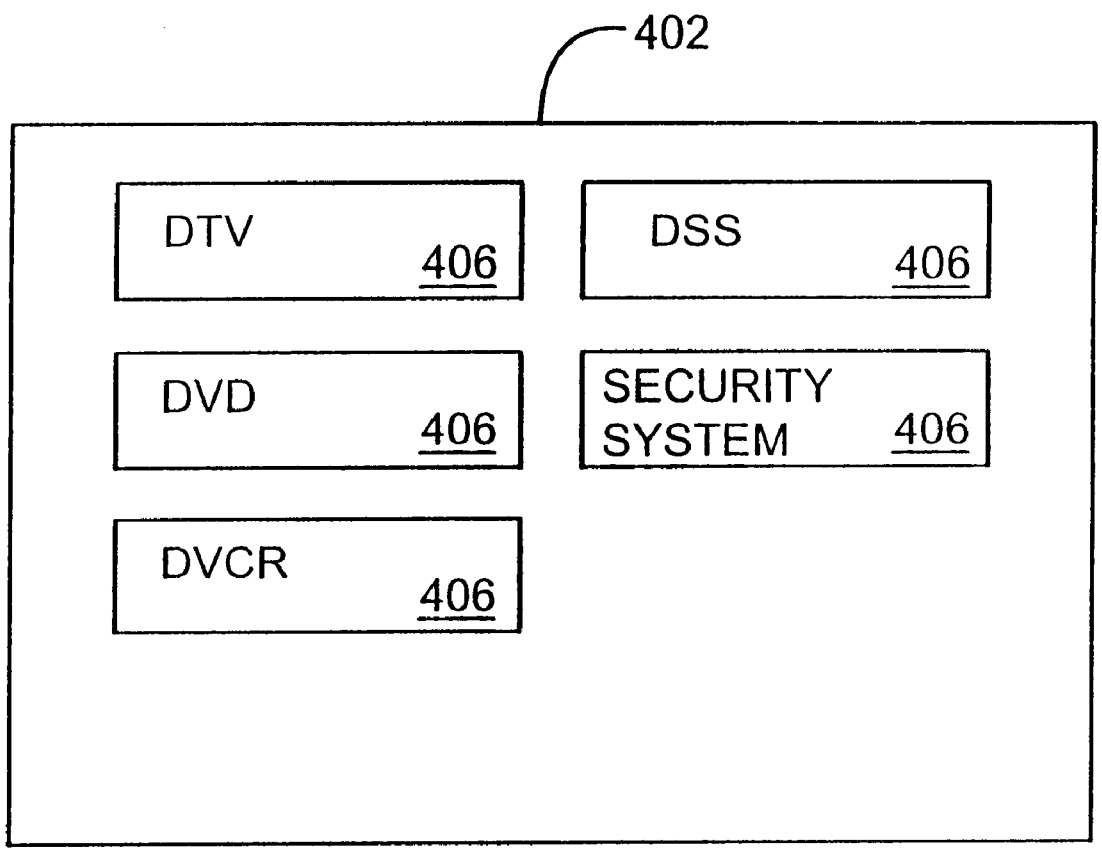
FIG. 5A is a block diagram of a device link page in accordance with the present invention.
Figure 5B:
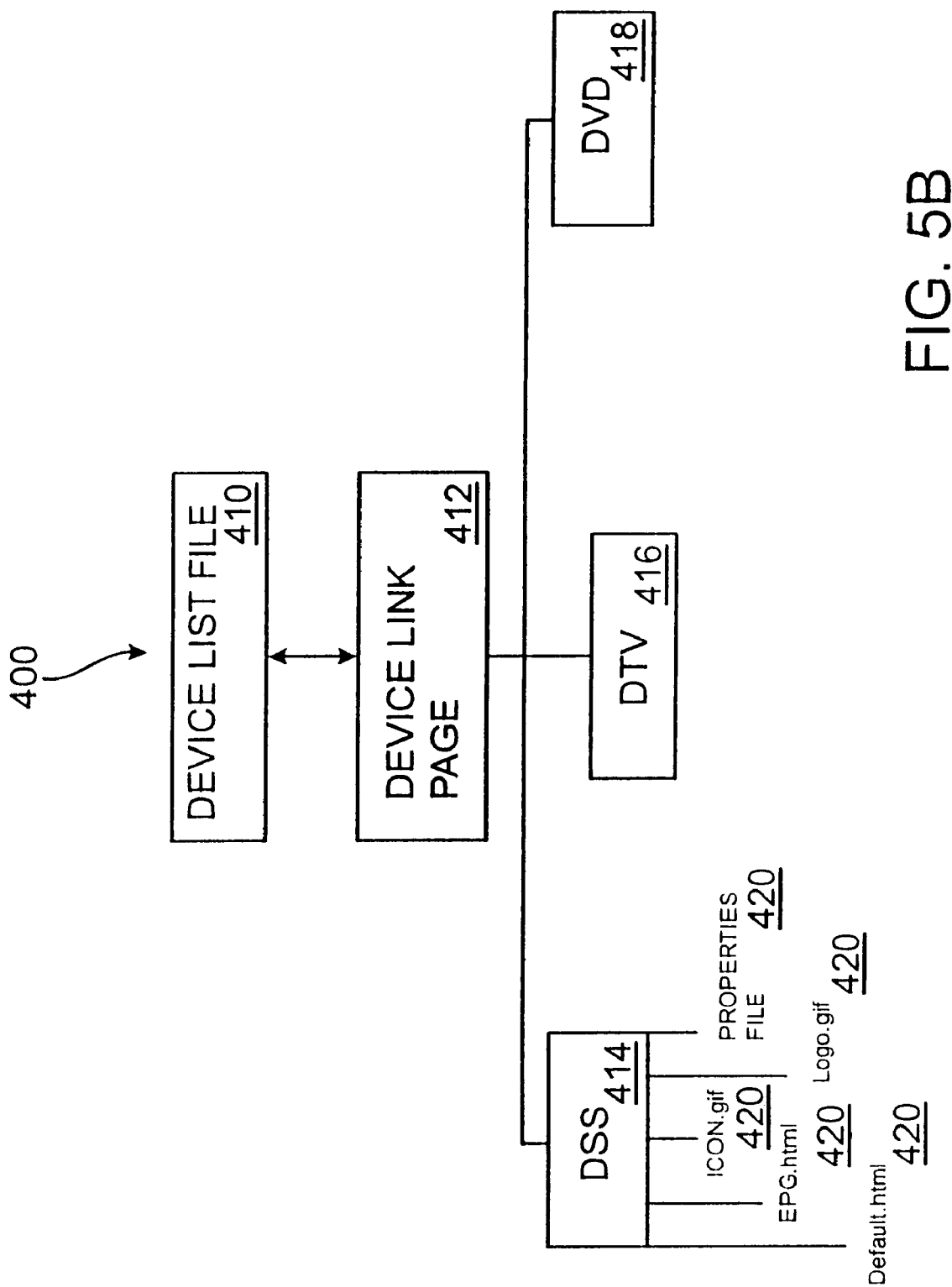
FIG. 5B illustrates an example of a home device tree structure according to certain embodiments of the invention.

FIG. 5B illustrates an example of a home device tree structure 400 according to certain embodiments of the invention. In this example, the home device tree structure 400 contains a device list file 410, a device link page 412 and three top-level device pages (DSS 414, DTV 416 and DVD 418). Using the device information contained in device list file 410, the auto-tree builder generates the device link page 412 and inserts links (e.g. hypertext links) to the top-level page of each device (DSS 414, DTV 416 and DVD 418). In this example, the device page DSS contains several data files 420 that can be accessed via the link between the device link page 412 and the DSS top-level device page 414.

In certain embodiments, in generating the device link page, the auto-tree builder uses the device list file to create a device HTML file that contains a home device button for each home device that is currently connected to the home network. Using the IP addresses contained in the device list file, the auto-tree builder accesses each home device to obtain the Properties file information and the URL of the top-level page (i.e. USER.HTML file) associated with each home device. Using the respective URL information, the auto-tree builder converts each home device button in the device HTML file to a hyper-text link to the top-level page of the respective home device. This device HTML file is then used as the device link page.

For example, FIG. 5A is a device link page 402 according to one embodiment of the invention. As depicted, device link page 402 contains home device buttons 406 for each home device connected to the home network 100. Each home device button 406 is associated with a hypertext link to the top-level home page of the corresponding home device. If a user selects a particular home device button 406 contained in the device link page 402, the respective device's home page is subsequently displayed to the user.

In certain embodiments of the invention, the auto-tree builder also retrieves the ICON.GIF image file that is stored in each home device. The auto-tree builder then uses the ICON.GIF images for displaying each of the corresponding home device buttons.

Figure 6:
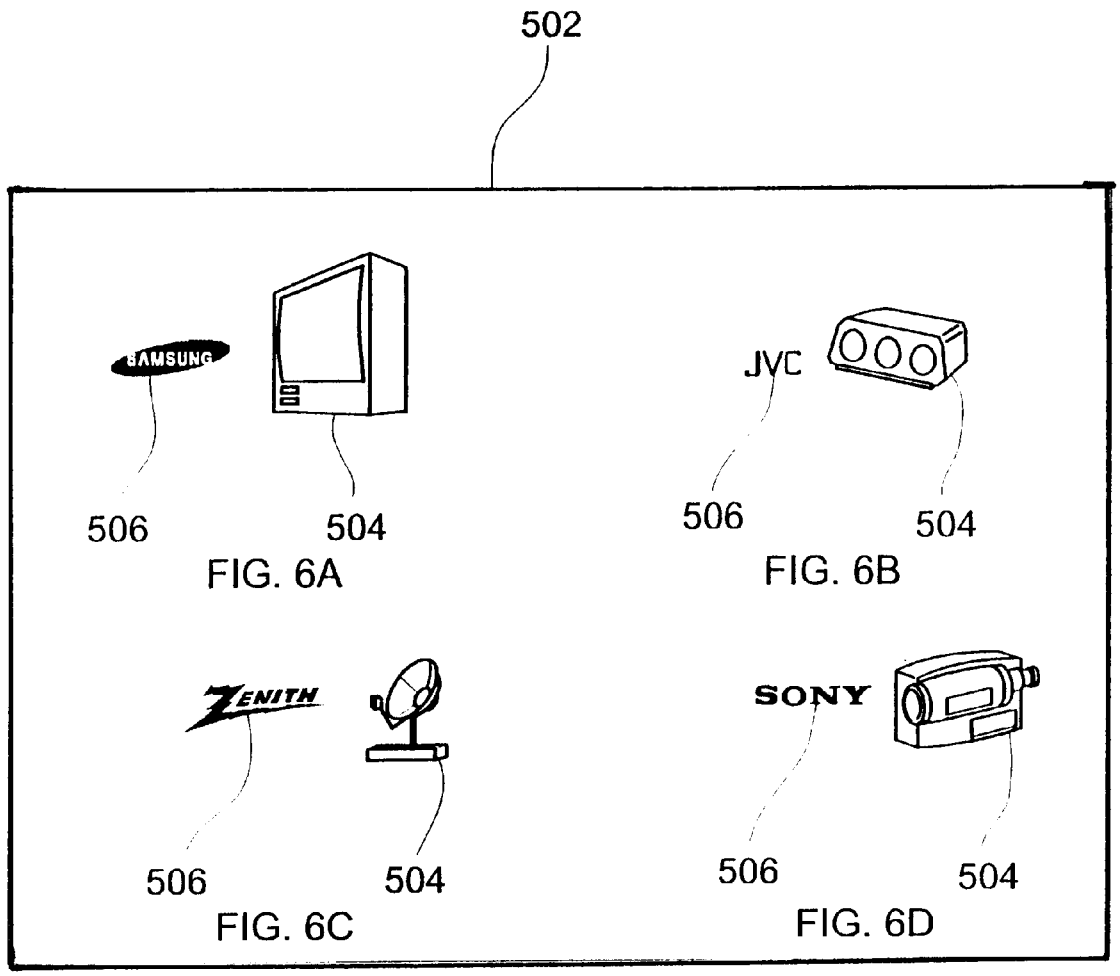
FIG. 6 graphically depicts a view of a device link page in accordance with the present invention.

In addition to the ICON images, in certain embodiments, the auto-tree builder also obtains the LOGO.GIF image file for each home device. The auto-tree builder associates each LOGO.GIF image with a hypertext link to the home page of the device's manufacturer. The LOGO image is then included in the device HTML file. For example, FIG. 6 is a device link page 502 according to one embodiment of the invention. As depicted, the device link page 502 contains home device buttons 504 and manufacturer device buttons 506. The home device buttons 504 are represented by the ICON.GIF images of each corresponding device: The manufacturer device buttons 506 are represented by the LOGO.GIF images of the respective manufacturer of the corresponding home device.

Figure 7:
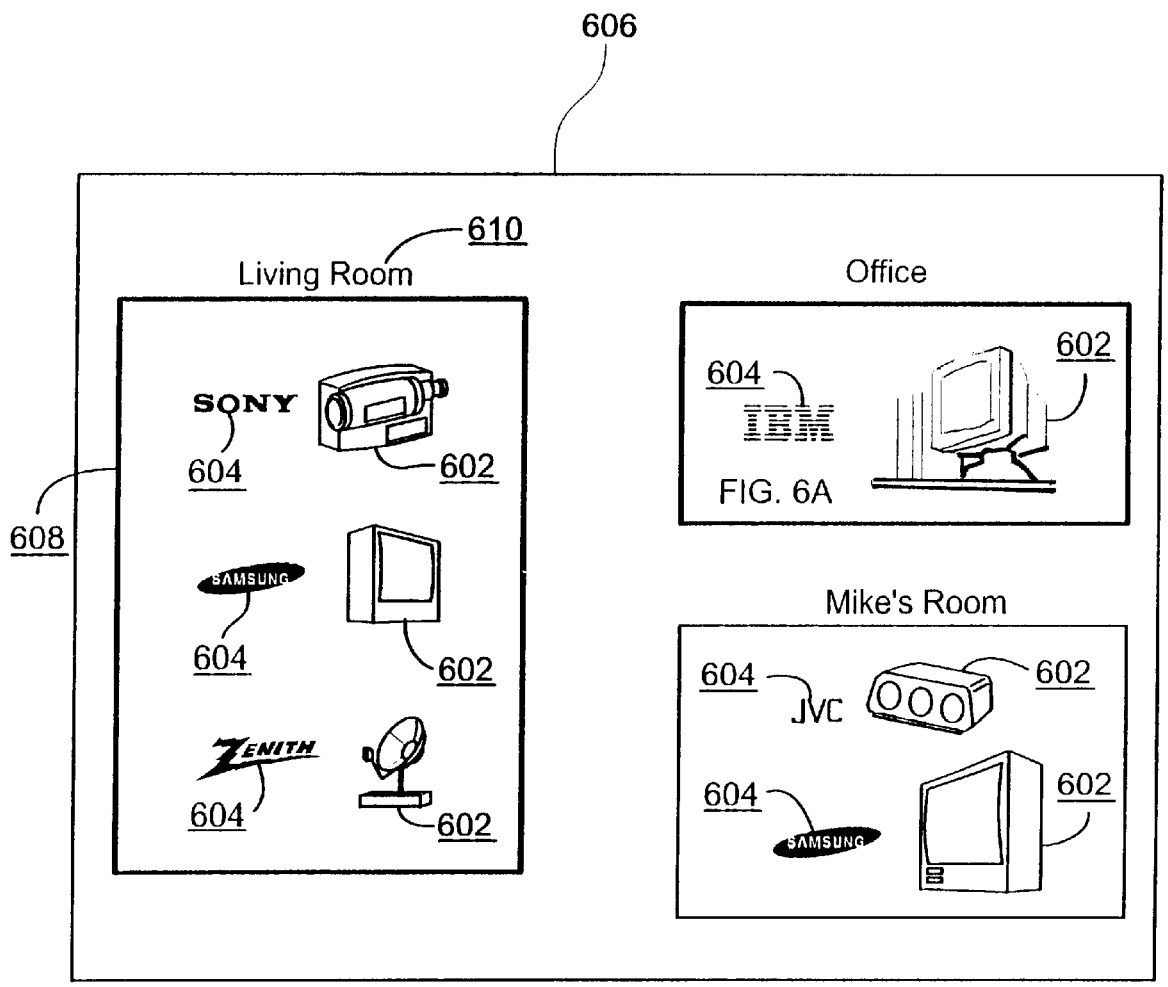
FIG. 7 graphically depicts an alternative view diagram of a device link page in accordance with the present invention.

In certain embodiments, as depicted in FIG. 7, the user may define the arrangement of device images 602 and logos 604 on the device link page 606, according to his or her own criteria. For example, a user may arrange the device images 602 and associated logos 604 in groups according to the respective home device's placement in the home, e.g., on a room by room basis. In such an example, a camcorder manufactured by SONY, a DTV manufactured by Samsung and a DBSS manufactured by Zenith may all be grouped in a living room group 608. In this embodiment, the user may also include additional text lines 610 to describe the groupings and/or the devices depicted by the device images 602 and associated logos 604.

Session Manager

As previously noted, a session manager provides the primary interface between a user and a home network. The session manager, when properly activated, generates a session page that provides an interface which allows users to command and control the home devices that are connected to the home network in order to perform various functions and/or services. Some typical services that are available on a home network include, but are not limited to, starting a movie playing, programming a DBSS, and recording a television program.

The session manager displays available home network services (servers) and matches capabilities and selections made in one graphic user interface (GUI) with another GUI to facilitate sensible and easy selection, thus simplifying use of the home network.

Figure 9:
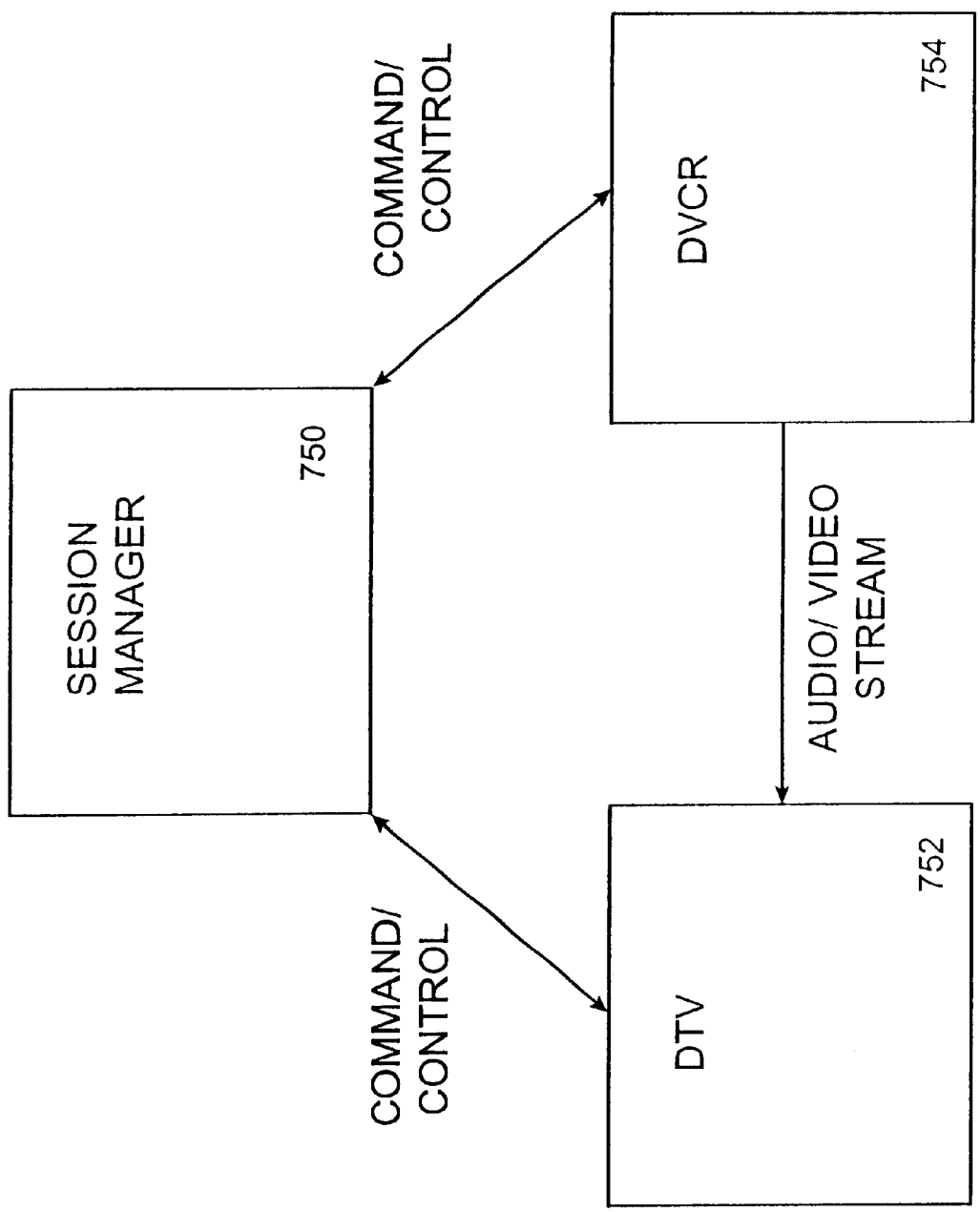
FIG. 9 is a block diagram illustrating a session manager causing two home devices to communicate over a home network according to certain embodiments of the invention.

FIG. 9 is a block diagram illustrating a session manager 750 causing two home devices (DTV 752, DVCR 754) to communicate over a home network according to certain embodiments of the invention. As depicted in this example, by sending command and control information to the home devices (DTV 752, DVCR 754), the session manager 750 causes the home devices (DTV 752, DVCR 754) to communicate with each other (i.e. audio/video stream). For example, to display a recorded TV show, the session manager 750 sends command/control information to cause the DVCR 754 to broadcast information (e.g. the TV show) on a particular stream over the home network. In addition, the session manager 750 sends command/control information to cause the DTV 752 to display the information that is being broadcast on the particular stream over the home network.

Similarly, though not shown in the drawing Figure, the session manager may send command/control information to cause a tuner (for example the DBSS) to broadcast a TV show on a stream over the network and may send further command/control information to either or both the DTV and DVCR to display and/or record the TV show.

In still another alternate embodiment, if a single physical housing, or package, were to include both a DTV and a tuner (i.e., two separate logical devices), the command/control information sent to the housing would cause the tuner therein to broadcast a TV program on a stream over the home network to either (or both) the DTV in the same housing and/or to the separately housed DVCR.

More specifically, client/server control actions may be implemented to initiate an A/V program source stream and a sink server stream. Once data is flowing, the session manager client may disengage from this activity and perform other functions. In controlling the illustrative configuration, the session manager may cause the DVCR 754 to save a first state, e.g., "timer record", and the DTV to save a second state, e.g., "timer select a program". A clock later triggers the saved states into action. In this example, no further control actions are required of the session manager. However, for more complex examples, the session manager may remain in, or regain, control, or may initiate further control of other devices.

Although the basic model illustrated in FIG. 9 shows one client and two servers, one server representing the control program controlling the DTV as providing a display service and the other representing the control program controlling the DVCR to provide a recording service, the model can be extended to a plurality of N servers where N>2.

Figure 8:
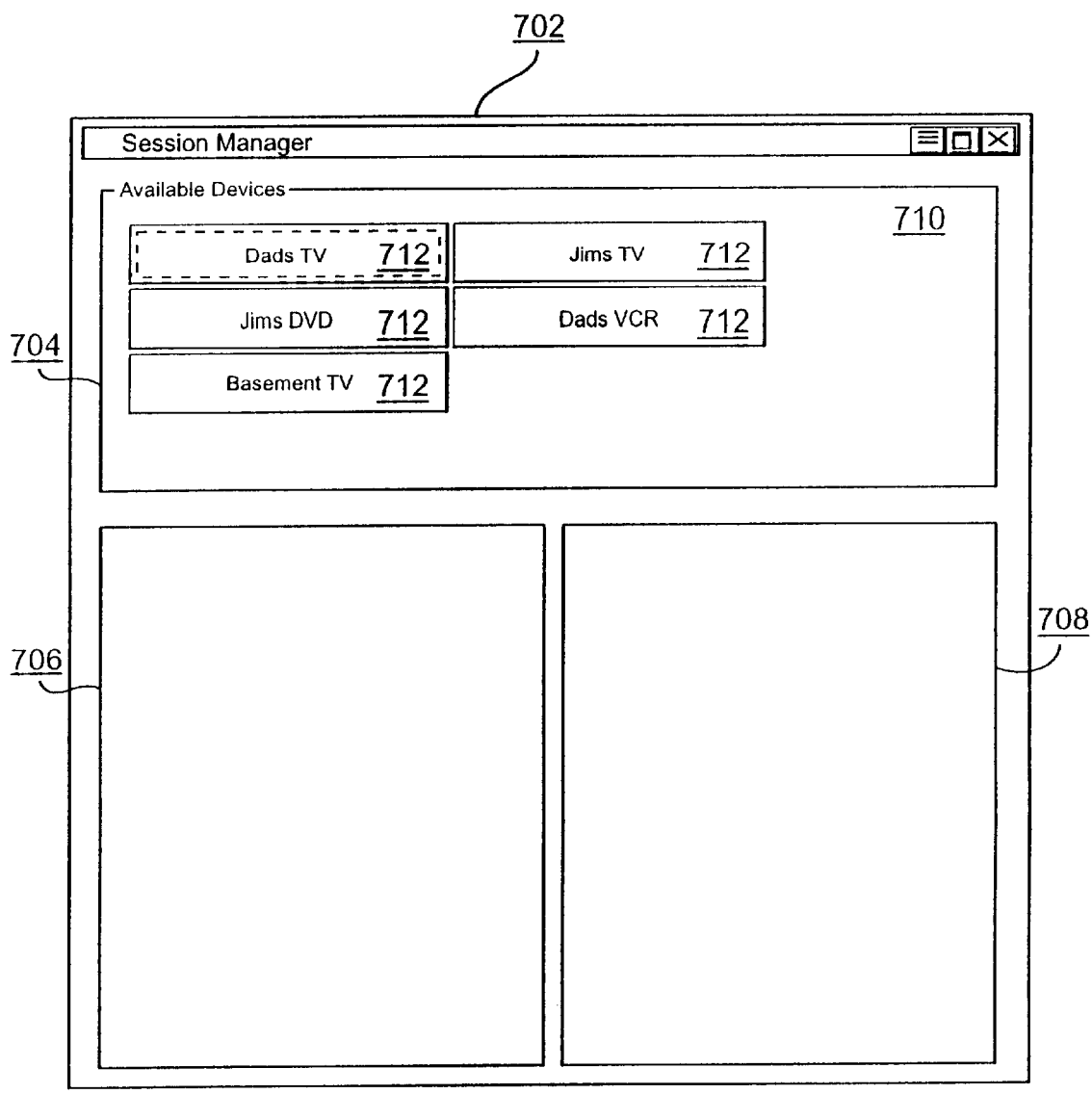
FIG. 8 graphically depicts a preliminary view of a session page in accordance with the present invention.

FIG. 8 illustrates a session page 702 according to one embodiment of the invention. In this example, the session page 702 contains frames 704, 706 and 708. As depicted, frame 704 contains a device link page 710 that contains device buttons 712 for each home device currently connected to the home network.

When the session manager is activated, it causes the auto-tree builder process to generate a new device link page. In certain embodiments, the session manager is notified as home devices are dynamically added and removed from the home network. For example, referring back to FIG. 4B, when the GENIP process 316 determines that a home device has been either added to or removed from the home network, the GENIP process 316 notifies the session manager. The session manger then causes the auto-tree builder process to generate a new device link page.

In an alternative embodiment, the session manager periodically polls the device list file 318 to determine if it has been updated with new home device information. If the session manger determines that device list file 318 has been updated, the session manager causes the auto-tree builder process to generate a new device link page.

In certain embodiments of the invention, the auto-tree builder process functions are contained within the session manager. Thus, in one embodiment of the invention, the session manager generates the device link page by performing the previously described auto-tree builder functions.

A critical function of the session manager is to enable a user to initiate an available service on the home network. An available service is a particular function that can be performed by one or more home devices that are currently powered-on and connected to the home network. For example, a service may consist of selecting a DTV for viewing a particular TV show and tuning the DBSS to a particular station that is carrying the respective TV show.

To enable a user to initiate an available service, when the user selects a particular home device button 712 from the device link page 710, the session manger causes the top-level home page of the selected home device to be displayed within a frame contained in session page 702. For purposes of explanation, it shall be assumed that a user selects the device button 712 corresponding to "Dad's TV".

Figure 10:
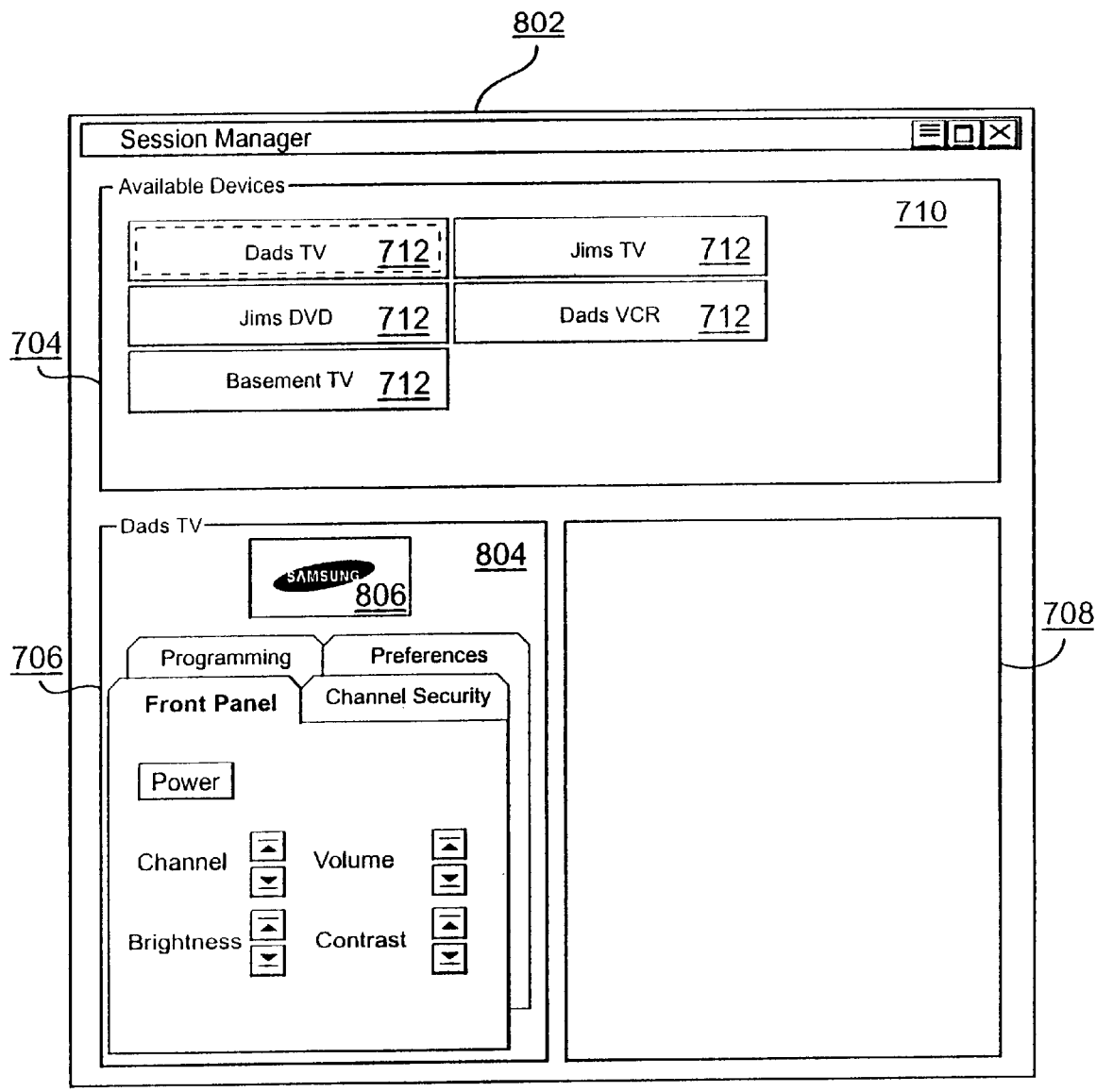
FIG. 10 graphically depicts a secondary view of the session page in accordance with the present invention.

As shown in FIG. 10, when the user selects the device button 712 for Dad's TV, the session manager displays the top-level home page 804 for the respective home device in a frame 706 of the session page 802. FIG. 10 is similar to FIG. 8 and, therefore, like components have been numbered alike. As depicted in FIG. 10, in certain embodiments of the invention, the LOGO image 806 that is associated with the selected home device is displayed within the frame 706.

After a device image 712 is selected, the session manager continues to display the contents of the device link page 710. However, in certain embodiments, the selected device button 712 is deactivated and is, therefore, non-responsive for further selection by the user. For example, when the device button 712 corresponding to Dad's TV is selected, it is deactivated and becomes non-responsive to further selection by the user.

When the user selects a home device button 712, the session manager obtains the particular capabilities of the selected home device. The particular capabilities of a home device includes a list of standard named functions that the respective home device is capable of performing, e.g., the capabilities of a DVCR generally include "accepting video" and "displaying video".

In certain embodiments, the session manager obtains the particular capabilities of a selected home device by accessing a standard named file on the respective home device.

After obtaining the particular capabilities of the selected home device, the session manager searches the capabilities of the other home devices that are represented in the device link page 710 (i.e., listed in the device list file), for matches to the particular capabilities of the selected home device. For each home device found to have a matching capability to the selected home device, the session manager continues to activate the respective device button 712 (i.e., maintains it responsive to selection by the user). For each home device that is found to have no matching capabilities to the selected home device, the session manager deactivates the respective device button 712 (i.e., sets it non-responsive to selection by the user) in order that the user may not further select the respective device for the current session.

For example, where the user has selected a client device such as a TV display, the session manager may specifically search for matching devices which are capable of acting as video servers, or sources, rather than for other displays. Under such circumstances, the session manager may deactivate buttons for other displays. Alternatively, in a "control only" mode of operation, where a server-client relationship is not being established, the session manager does not seek a second device which may act as a source for the selected device.

More particularly, in accordance with the invention it is possible to operate with a number of software agents representing devices which are capable of controlling lights, for example. In such an environment, the user would select both a control device, which is not a source or server of information, and one or more light devices to be controlled thereby. When the user first selects the control device, the session manager may then identify various devices capable of being controlled by, or interacting with, the selected device and continue to activate the respective device buttons thereof, while deactivating the buttons for other devices. Indeed, it should be appreciated that the session manager may select any number of devices for presentation to the user as possible choices for operation, for which the selection buttons remain activated. The devices may or may not co-operate with each other. That is, the devices whose buttons remain activated may operate in cooperation with, or independently of, each other.

Where an information presentation device is selected, it may be possible that a plurality of servers may remain active for possible selection. For example, in accordance with some embodiments of the invention, when a device button for a DTV or DVCR is selected, the session manager may activate device buttons for several information sources, such as an audio server and a video server. Indeed, it is also possible that device selection buttons may remain activated for selection of plural video servers, and that upon selection of one video server the buttons for selection of other servers will be maintained activated, to account for situations wherein it is desired to provide multiple images on a single display. For example, it may be desirable to display an entertainment video while simultaneously displaying, as a picture-in-a-picture, video from a security camera or from another server. Alternatively, video information from one or more sources may be communicated to a plurality of client displays.

It should thus be appreciated that, as appropriate information on capabilities of device interaction is provided to the session manager, the session manager will indicate that various of the devices are, or are not, enabled for selection by the user based on the user's prior selections. By acting as an agent for the user, the session manager obtains information relating to device capability and, in response thereto, deactivates selection buttons for particular devices while maintaining active the device selection buttons for other devices. By determining whether and which devices have matching capabilities, and by graying out (deactivating) buttons for non matching devices and activating buttons for matching devices, the session manager thus assists the user with making selections associated with the devices, or with managing the devices.

With such assistance, the user may then select a second home device to interact with the previously selected home device in order to perform the desired service. Where the session manager has inhibited some selection possibilities and enabled others, the user's selection is simplified. Where the matching, selection, inhibiting or enabling has not been carried out by the session manager, the user performs the selection based on various criteria. For example, the user may simply wish to select or activate a specific device. Alternatively, the user may wish to select all devices capable of performing a specific function.

In that regard, the session manager may generate a page which includes all contents of the network, and all functional capabilities, independent of specific device. Thus, the HTML page may identify services available to the user by content, such as by providing a list of video or audio programs, etc., which are available on the home network regardless of the device on which such content is being provided. Such a display is user transparent in the sense that the user is permitted to select information sources based on content, rather than equipment, device or channel through which the information is made available.

On selecting the second home device, the session manager displays the home page for the second home device in frame 708. The order in which frames are chosen for displaying the home page of each selected device is not critical, and therefore, in certain embodiments of the invention, the home page of the first selected device is displayed in frame 708 and the home page of the second selected device is displayed in frame 706.

Figure 11:
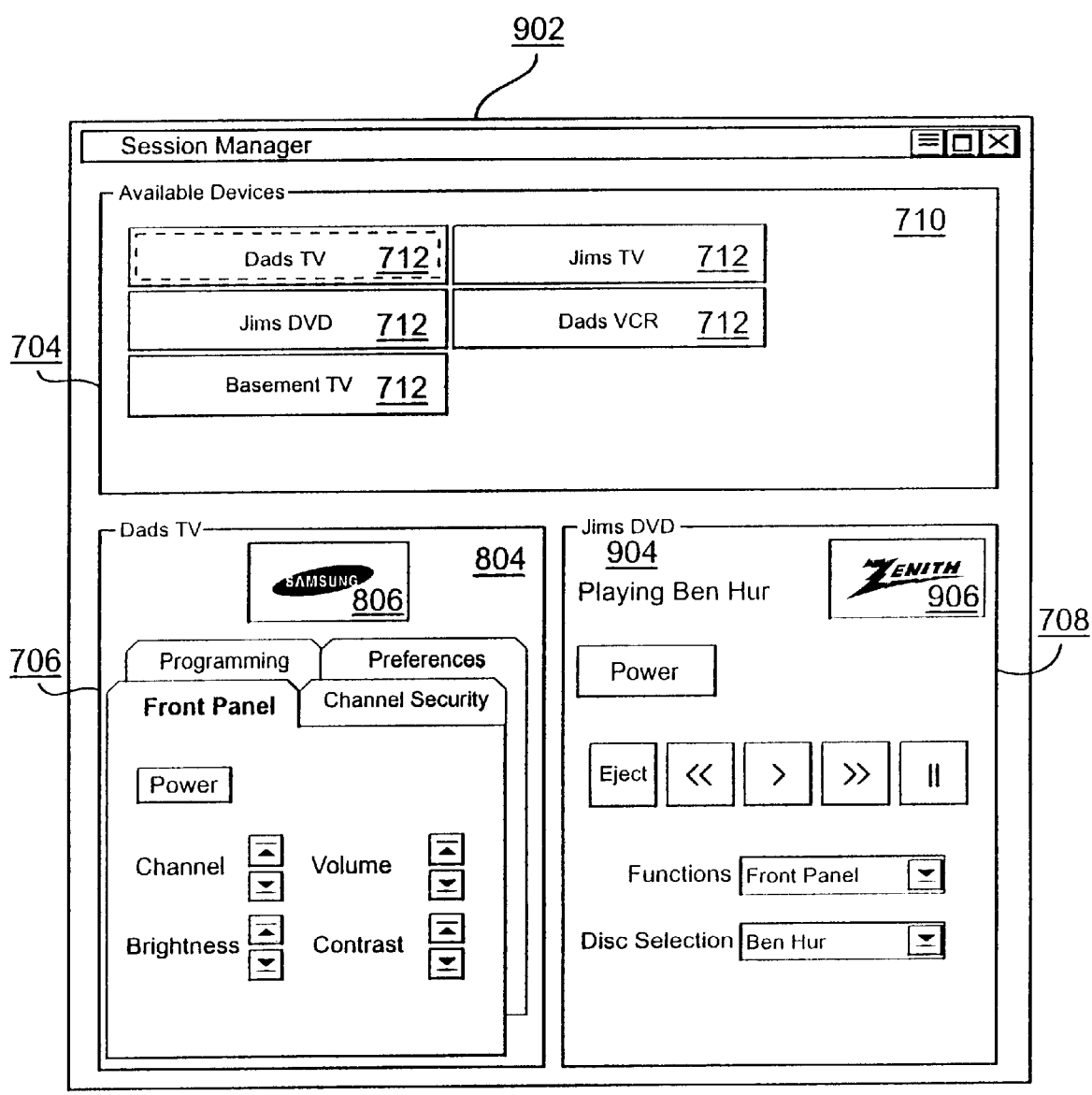
FIG. 11 graphically depicts a third view of the session page in accordance with the present invention.

FIG. 11 illustrates session page 902 after the selection of a second home device according to one embodiment of the invention. As shown in FIG. 11, when the user selects the device button 712 corresponding to Jim's DVD in this example, the session manager displays the top-level home page 904 for the respective home device in a frame 708 of the session page 902. FIG. 11 is similar to FIG. 9 and FIG. 10 and, therefore, like components have been numbered alike. As depicted in FIG. 11, in certain embodiments of the invention, the LOGO image 906 associated with the selected home device is displayed within the frame 708.

Once two home device images have been selected, the session manager allows the respective home devices to communicate with each other to set up and perform the desired service as selected by the user through the options displayed on the respective home pages 804 and 904 of each selected home device.

Figure 12A:
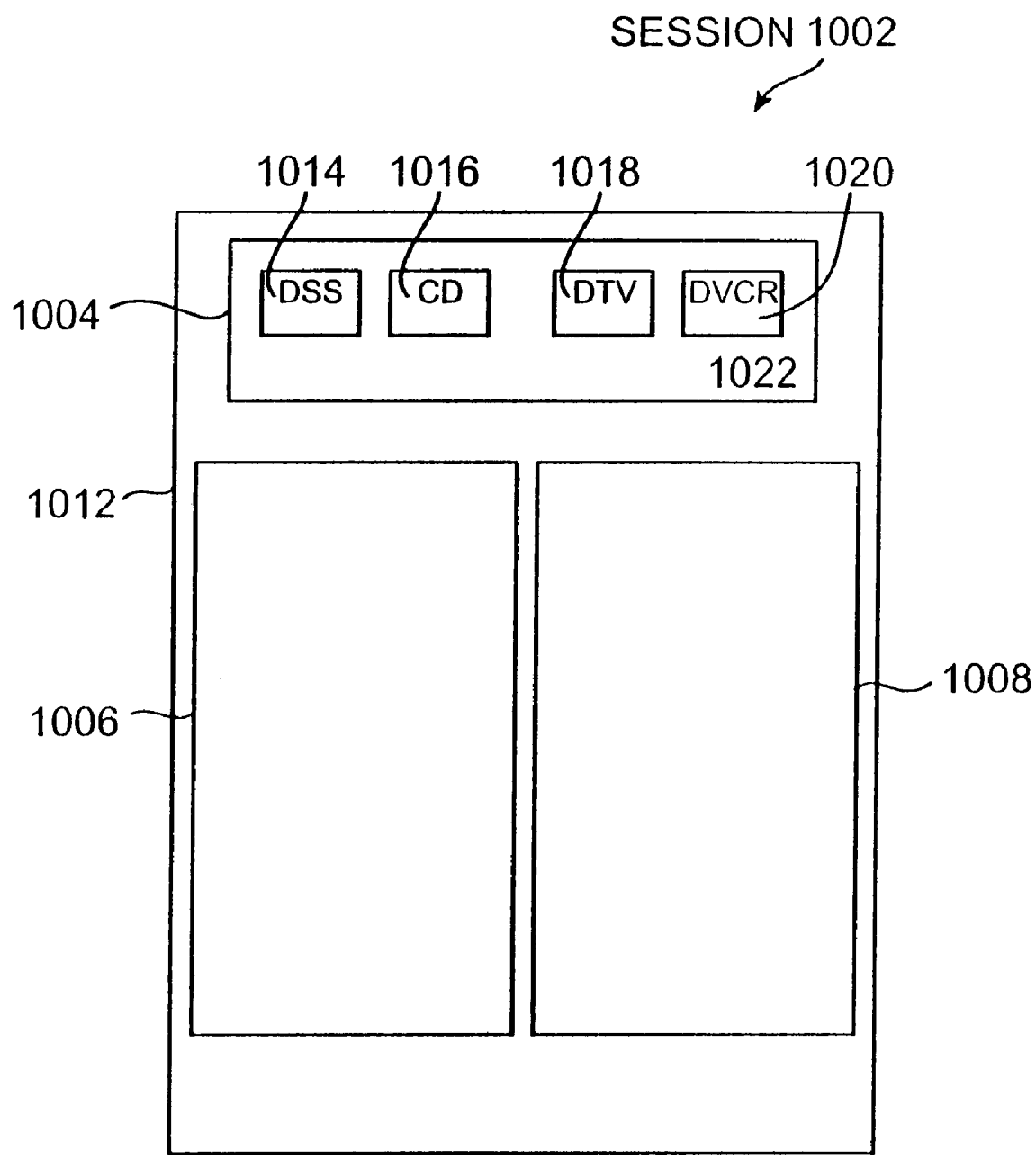
FIG. 12A is a block diagram of a session page in accordance with the present invention.
Figure 12B:
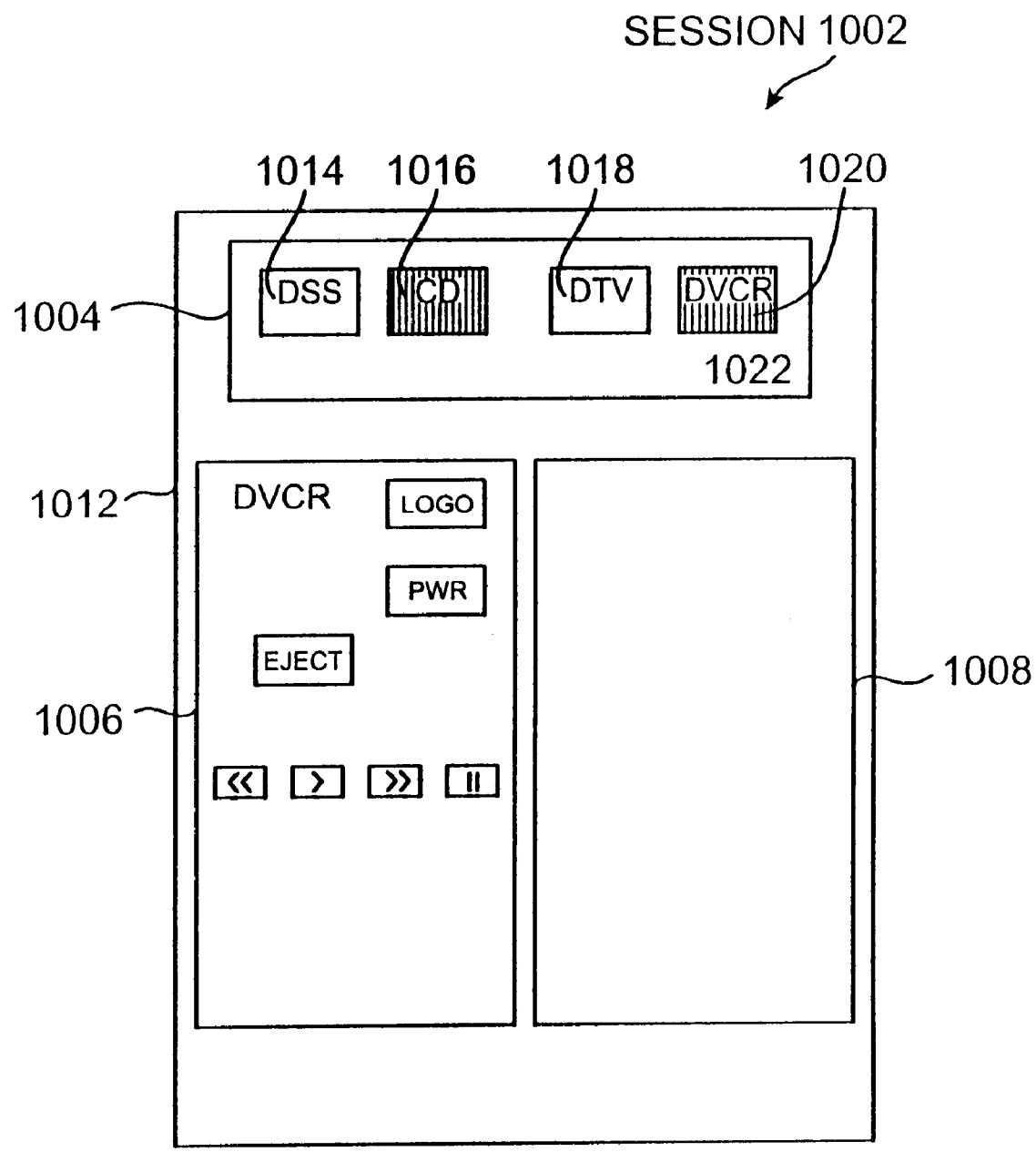
FIG. 12B is another block diagram of the session page in accordance with the present invention.
Figure 13:
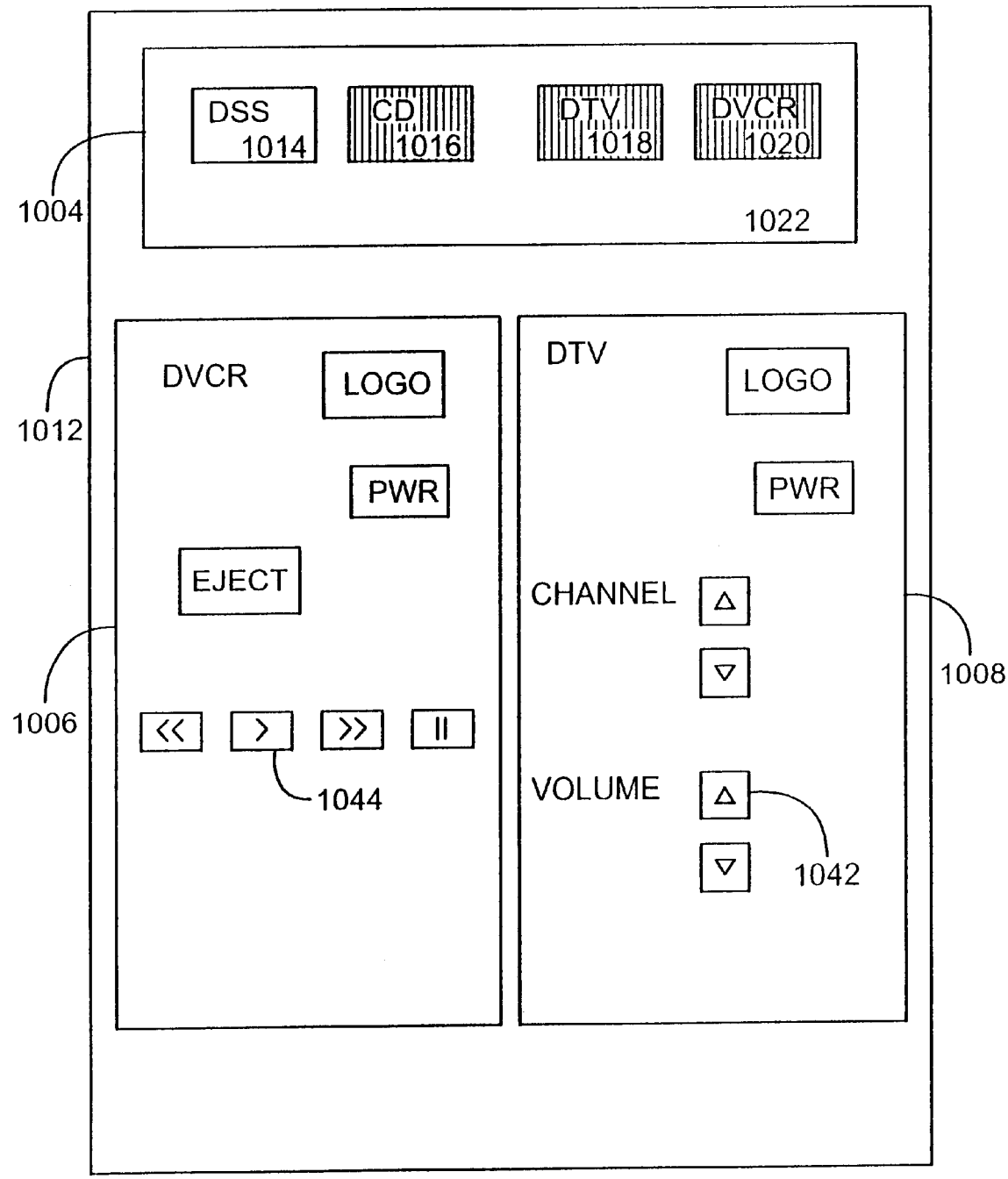
FIG. 13 is another block diagram of the session page in accordance with the present invention.

An example of an embodiment of a session manager session 1002 is displayed in FIGS. 12A, 12B and 13. In this example, as depicted in FIG. 12A, the user may choose one of four device images displayed in a device link page 1022 contained in frame 1004 of a session page 1012. In this example, the user may select a DSS device button 1014, a CD device button 1016, a DTV device button 1018 or a DVCR device button 1020. For explanation purposes, it shall be assumed that the user selected the DVCR device button 1020.

As depicted in FIG. 12B, when the DVCR device button 1020 is selected, the session manager displays the home page for the respective DVCR in frame 1006 of the session page 1012. The session manager continues to display the four device images in the device link page 1022 of the session page 1012. After the user selects the DVCR device button 1020, the session manager determines the particular capabilities of the selected DVCR device and compares them with the particular capabilities of the other accessible devices on the home network, i.e., the DBSS, the CD and the DTV.

In this example, the session manager determines that there is a match in capabilities between the selected DVCR and both the DTV and the DBSS. The session manager also determines that there is not a match between the capabilities of the selected DVCR and the capabilities of the CD. Thus, the session manager deactivates the device button 1016 for the CD in the device link page 1022. Additionally, because the DVCR device button 1020 was selected by the user, the session manager now deactivates the DVCR device button 1020 on the device link page 1022.

Because the session manager found matching capabilities between the selected DVCR and the DBSS and the DTV devices connected to the home network, the session manager continues to keep the device buttons 1014 and 1018 active for these respective home devices in the device link page 1022. Therefore, in this particular example, the user may now additionally select either the DTV device button 1018 or the DSS device button 1014 in order that the selected respective device may interact with the previously selected DVCR to perform a particular service on the home network. However, because the CD device button 1016 has been deactivated, as there are no shared capabilities between the CD and the previously selected DVCR, the user may not select the CD device button 1016 at this time.

In this example, the user additionally selects the DTV button 1018 contained in the device link page 1022.

As depicted in FIG. 13, the session manager then displays the home page for the respective DTV in frame 1008 of the session page 1012. The session manager continues to display the DVCR device's home page in frame 1006 and the four device buttons 1014, 1016, 1018 and 1020 in the device link page 1022 of the session page 1012. The user may now select control options from the home pages of each selected device (e.g., play 1044 and volume 1042 respectively from the DVCR and the DTV home pages) in order to command and control the respective home devices to function in a particular manner.

Any home device connected to a home network that can act as a client, i.e., which has the capability to display HTML files via is respective display unit (e.g., a DTV or a PC), may be designated a session server. A session server is a device that contains a session manager, a display unit (i.e., screen), its own HTML page files, including a top-level, home HTML page file, and a browser.

In certain embodiments, when a session server (e.g., a DTV, general purpose computer) powers up, the associated session manager is executed and a session page, as discussed previously in FIG. 12A, is displayed on the display unit of the particular session server. The user may then select a home device to command in order to perform a desired function or service.

In an alternative embodiment, when a session server powers up, its respective browser runs and displays the top-level home page for the respective session server. In certain embodiments, the session server's home page is associated with a standard filename, such as USER.HTML. Associated with the session server's home page is a device page button option which, when selected, causes the session manager executing on the session server to display a session page as discussed previously in FIG. 12A.

Executing a Service

As previously indicated, the session manager is the primary interface between the user and a home network. It is a tool capable of accessing and controlling every home device on the network, and, generally, should be available on every browser-based home, i.e., client, device.

The session manager enables a user to begin a service on the home network. As previously discussed, in relation to FIGS. 12A, 12B and 13, a session manager allows an user to choose up to two home devices at one time, which he or she wishes to control to perform a specific service.

Each home device possesses one or more capabilities. For example, a DVCR is capable of both accepting and outputting a video signal, a CD player is capable outputting an audio signal, and a DTV is capable accepting video signal. Capabilities are either source-like or sink-like. A CD player posses a source-like capability as it is capable of outputting an audio signal. In contrast, a DVCR possess both source-like and sink-like capabilities as it can accept and output a video signal.

Each source-like capability has a complementing sink-like capability that is compatible with it. For example, the outputting video capability of one home device is complemented by the accepting video capability of a second home device. Each capability is associated with a certain set of data specifications. For example, when a DVCR outputs a video signal, the video signal is broadcast on a particular stream of the over the home network. The stream number and other information about the signal form part of the DVCR's (outputting home device) data specification message. Therefore, in one embodiment, to execute a session, a first home device (outputting home device) communicates a data specification message to a second home device (accepting home device) via the session manager.

To provide for home device communication, each home device has a control application associated with it. The control application for a home device handles the communication between the session manager of the respective home network and the home device. Therefore, the control application for two respective home devices, provides a mechanism that allows two home devices to communicate with each other via the control manager. In certain embodiments, the control application is a device-specific packet of Java code that communicates with the hardware of the respective home device, thereby controlling that home device.

By having a control application associated with each home device on the home network, the control implementation details of the respective home device are grouped and maintained within a vendor-supplied device application. The control application of a home device further enables the respective vendors to provide their own control scenarios for their devices. All of the control applications of the home devices on the home network, however, must comply with certain pre-defined specifications in order to enable a respective home device to communicate with the session manager.

In certain embodiments, each home device on the home network has a list of data specifications associated with it. For example, a DVCR that has been instructed to "Output Video", i.e., transmit a video signal, broadcasts the video signal on a particular isochronous stream. The stream identification information and other details about the video signal form part of the data specifications for the DVCR. The control application of a home device, e.g., a DVCR, is capable of storing and advertising the home device's data specifications when queried by the session manager.

As previously discussed, the session manager can query various home devices for their particular capabilities. The session manager is also responsible for querying various home devices for their data specifications, in order to ensure the requested user service is properly established and performed.

Once a user selects two home devices to perform a particular service, the user must choose certain device options for each of the selected home devices to perform that particular service. By choosing various device options, the respective device's hardware is initialized to perform the service. The session manager coordinates the communication between the selected devices to establish their hardware configurations and to perform the requested service.

As an example, referring again to FIG. 13, if a user wishes to play a video on the DTV, the service will consist of the playing of a video in the DVCR and the displaying of the respective video on the DTV. After the user selects the PLAY command option on the DVCR, the DVCR, among other tasks, chooses the isochronous stream that the video signal will be broadcast on. This information, as well as other pertinent information regarding the signal to be broadcast and the particular DVCR hardware setup for broadcasting, i.e., the data specifications of the DVCR for the PLAY service, are subsequently forwarded to the session manager.

The session manager, upon receiving the data specifications from the DVCR, forwards the information to the DTV, in order that the DTV may properly initialize its hardware to display the video signal broadcast by the DVCR. Some time thereafter, the session manager deletes the session page 1012 from the DTV display screen, allowing the DTV to display the video broadcast by the DVCR.

External Connection

Figure 14:
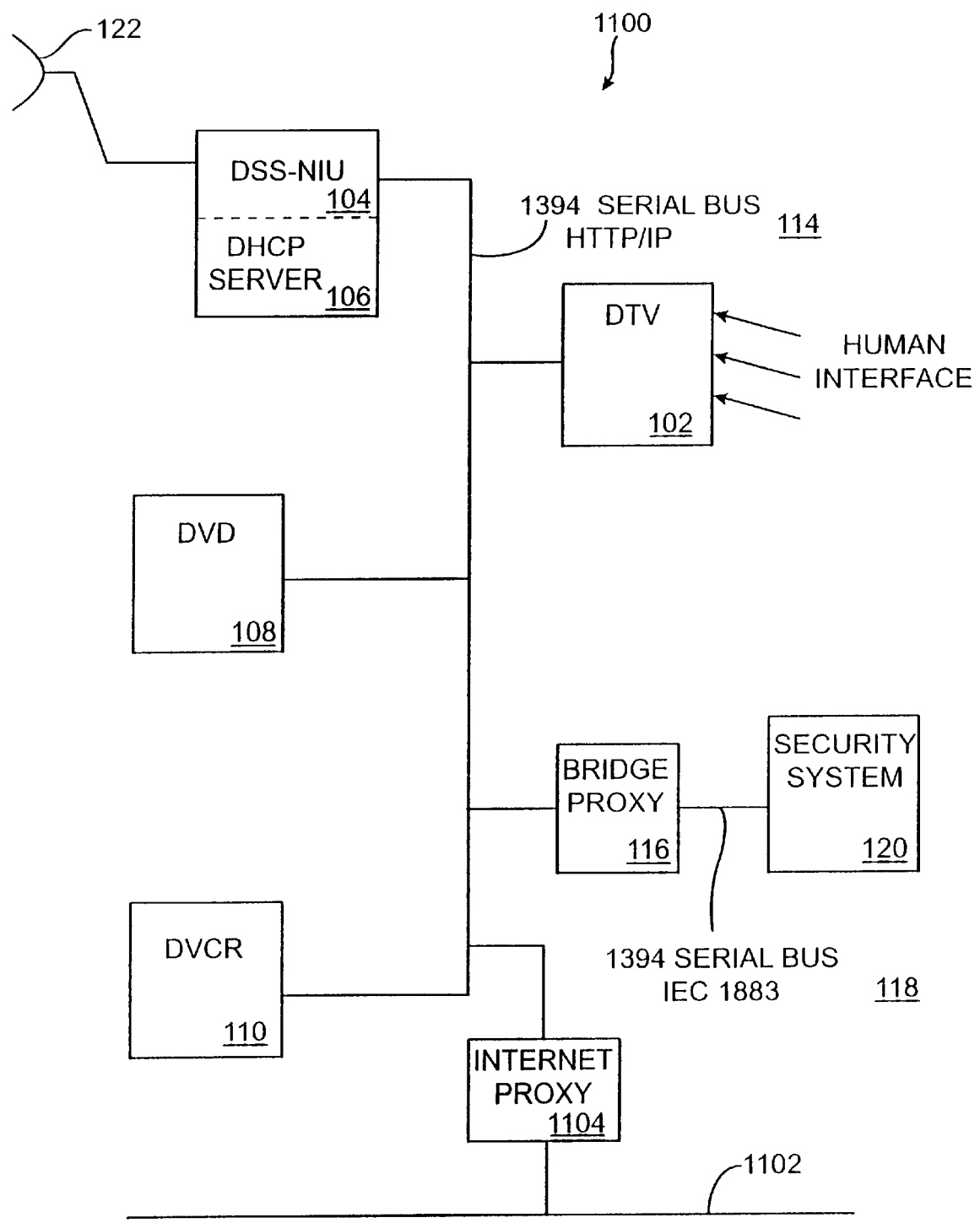
FIG. 14 is a block diagram of a home network that is connected to the Internet in accordance with the present inventions.

Because the home network is Internet protocol compatible, connecting the home network to the Internet can provide the advantage of being able to control home devices from outside the home. Therefore, in certain embodiments of the invention, a connection is provided which allows the home network to interface with the Internet. FIG. 14 depicts a home network 1100 connected to the Internet 1102 in accordance with the present invention. Because many of the components in FIG. 14 are similar to FIG. 1, like components are numbered alike.

As depicted in FIG. 14, in certain embodiments an Internet proxy 1104 is used to provide an interface between the home network 1100 and the Internet 1102. By providing an interface between the home network 1100 and the Internet 1102 a user can remotely control home devices connected to the home network 1100. For example, if a user is required to work late and is therefore unable to watch the Monday night football game, the user can program a DVCR connected to their home network via the Internet, in order to record the particular event.

Connecting the home network to the Internet can induce potential security access issues. Therefore, in certain embodiments, a security mechanism is associated with the home network that is used to restrict access to the home network to particular authorized users.

Macros

As described above, a user must typically perform a sequence of steps in order to cause a home device to execute a particular service. In addition, because users of a home network typically have dissimilar preferences as to the particular settings of certain home devices, a sequence of steps may be repeatedly performed in order to adjust the settings of a respective home device. For example, a first user may have a particular preference as to the brightness, tint and/or contrast of a particular DTV, while a second user has different preferences. To reduce the number of repeated steps typically performed by a user to set the settings of a particular home device, in certain embodiments of the invention a sequence of steps can be saved as a macro.

A macro is a sequence of commands that is saved in memory on a home device and which can be accessed and executed by a user. The macro executes as if the user actually selected a particular button or performed a particular action from within a HTML page contained on the respective home device.

The use of macros can significantly reduce the amount of work that is required by a user to perform a particular function as a single macro can be used to facilitate the convenient setup and control of several devices in tandem. For example, a user may want to record a particular TV program on channel 2 at 8:00 p.m. for 1 hour every Tuesday night. This normally requires the user to select a DBSS or DTV as the source of the program and to enter a particular sequence of steps to program a DVCR to receive and record the program. However, using a macro, the user need only perform the step of executing the particular macro. The macro then executes the necessary steps of selecting and commanding the particular devices in order to record the program.

There are multiple ways of generating macros depending on the particular respective home devices' software capabilities and the implementation of their HTML pages. In certain embodiments of the invention a preset type of macro is used which saves the actual values of a device's parameters. The preset type of macro can be used in a home network in which the parameter values of a particular home device can be queried and set. The preset macro is created by saving the current value of a particular set of home device parameters. Each macro is associated with a name so that it can be easily retrieved and executed at a later time. When a macro is subsequently executed it issues the appropriate commands to set the chosen parameters of the respective home device to their assigned value.

Figure 15:
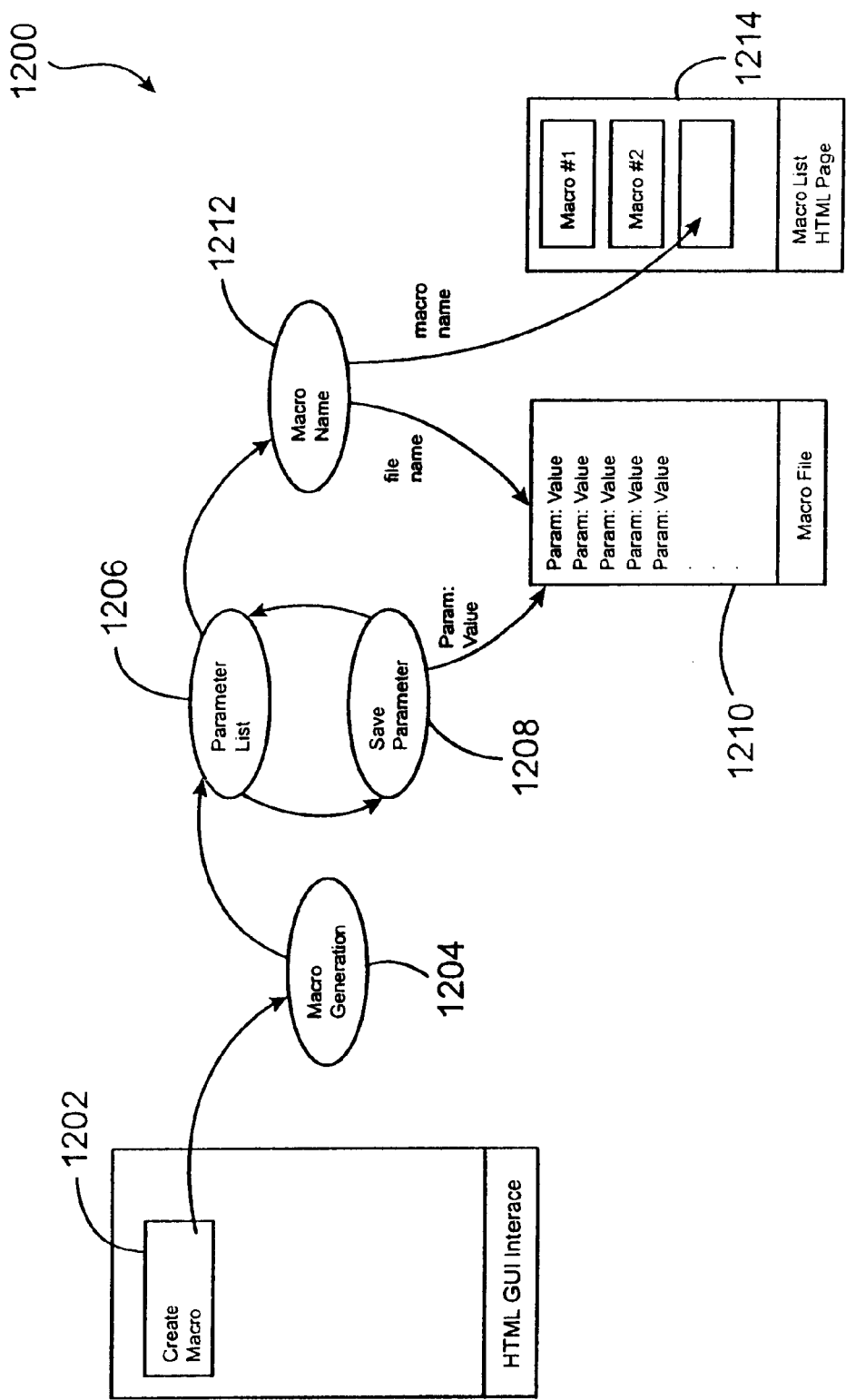
FIG. 15 is a diagram illustrating the creation of a macro according to one embodiment of the invention.

For example, FIG. 15 depicts the creation of a preset macro 1200 according to one embodiment of the invention. As depicted in FIG. 15, when a create macro button 1202 on a respective HTML page of a home device is selected, a macro generation process 1204 begins to execute. Execution of the macro generation process 1204 causes a set of user selected device parameter values 1208, selected from the home device's parameter list 1206, to be saved to a macro file 1210. The macro file 1210 is assigned a unique macro name 1212 and saved on the home device. The macro name 1212 is saved as a macro name button on the home device's macro list HTML page 1214. Thereafter, a user may select the macro name button, causing the respective macro file 1210 to be executed.

In one embodiment of the invention, a macro button is included on a respective home device's HTML home page. Selecting the macro button causes the macro list HTML page 1214 to be displayed to the user. In one embodiment, the create macro button 1202 is contained on the macro list HTML page 1214 for a respective home device.

In an alternative embodiment, a player piano macro is created by a home device's software and/or hardware saving the particular steps taken by a user while interacting with the device's HTML pages (e.g., the user's button selections, data entries and/or cursor movements are saved as they are executed by the user). Again, the created macros are associated with a particular name so that they may be easily retrieved and executed at a later time. When the player piano macro executes, it performs the particular sequence of instructions as if the user was accessing the respective home device HTML page(s) and executing the sequence of steps directly.

Figure 16:
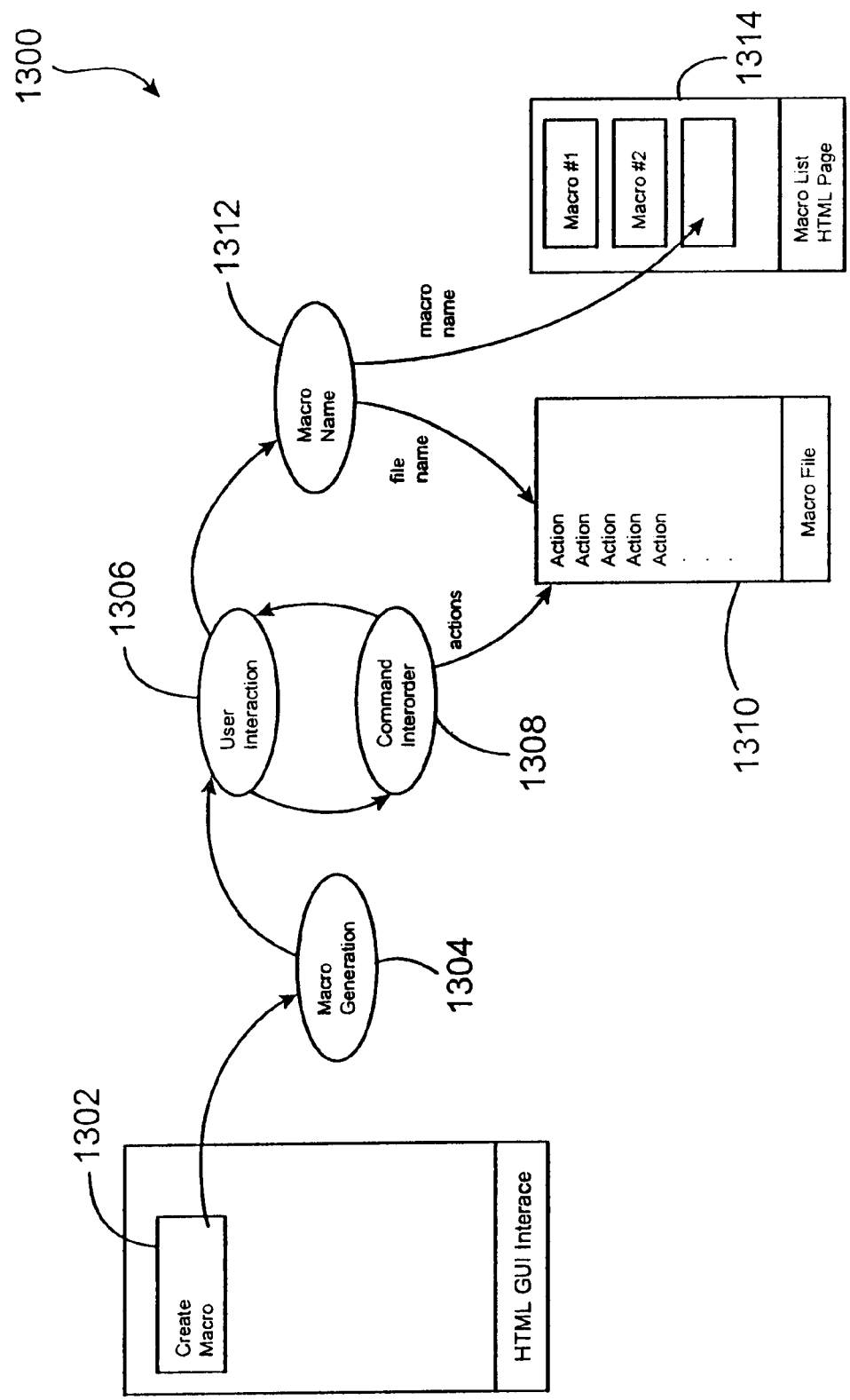
FIG. 16 is a diagram illustrating the creation of a macro according to another embodiment of the invention.

For example, FIG. 16 depicts the creation of a player piano macro 1300 according to one embodiment of the invention. As depicted in FIG. 16, when a create macro button 1302 is selected a macro generation process 1304 begins to execute. Execution of the macro generation process 1304 causes a user interaction 1306 to be interpreted as a particular action by a command interpreter 1308. The respective actions are copied into a macro file 1310, which is saved on the respective home device and assigned a unique macro name 1312. The macro name 1312 is saved as a macro name button on the home device's macro list HTML page 1314. Thereafter, a user may select the macro name button, causing the respective macro file 1310 to be executed.

In addition to the user created macros, in certain embodiments of the invention, a predefined set of macros are stored in the respective home device's memory for access by a user. Because macros are typically device dependent, in certain embodiments of the invention the manufacturer of a particular home device creates and defines a set of macros that can be executed on the respective home device.

Home Network Program Guide

To provide a user with a list of available multi-media material (e.g., audio and video programs, TV programs, and CDs), one or more home network program guides are associated with a home network. The one or more home network programming guides may be categorized as to the available multi-media material on a particular home device or may be combined in various ways to depict a particular group of accessible multi-media material.

A television programming guide typically provides a list and schedule of programs that are available for viewing on a particular channel. Most digital satellite services provide programming information through an Electronic Programming Guide (EPG). The EPG displays a list of available programs and the specific time in which the programs can be viewed through the service. The EPGs are continually updated to reflect a current window of available programs. The home network uses the EPG information to build a home network HTML program guide. The HTML program guide is developed using the HTML standards and can be displayed on a browser based home device. In addition, users can customize the particular programming information that is displayed. For example, if a user would prefer not to display the schedule for a particular channel, e.g., because of its programming contents, the user may request that channel be removed from the HTML program guide.

The information contained in an EPG is dependent on the particular DBSS that is used, and as such, there is currently no standard format for transmitting this information. Therefore, in one embodiment of the invention, a process extracts the information from a particular EPG and converts it into a standard program format. The standard program format is then used to build an HTML program guide. The HTML program guide can be displayed on any browser based home device (e.g., a DTV or a PC). Like the EPGs, the HTML program guide is periodically updated to reflect the currently available programs. As stated above, the user can customize the displayed HTML program guide to view only a particular set of the available information.

If an EPG format standard is developed, the HTML program guide can be built without first converting the EPG information into the standard program format. Therefore, in certain embodiments of the invention, the HTML programming guide is built using a standard EPG format as transmitted by a particular DBSS.

In addition to the EPG received on a DBSS, the home network can be associated with other home devices that contain multi-media material. For example, a DVD may contain certain movies, a PC may contain specific files (e.g., games, picture images), a DVCR may contain a particular movie, and a CD player may contain specific CDs. In certain embodiments, each home device maintains an HTML program guide file that contains a list of the material currently available on the respective home device. Using a browser based home device, a user can display the available material on a particular home device by rendering the particular home device's HTML program guide file.

In certain other embodiments of the invention, a multi-media identification process is tasked with searching the accessible home devices to determine what material is currently available on each of them. In one embodiment, the multi-media identification process accesses each home device to obtain a file or directory that contains a list of the available material on the particular home device. A home device contents process then creates one or more HTML program guide files that depict the material currently available to the user. A user can display the available material by rendering a particular HTML program guide file.

In an alternative embodiment, the multi-media identification process obtains the HTML program guide file that is maintained on a respective home device. Using the HTML program guide files obtained from the particular home devices of the home network, the multi-media identification process creates one or more HTML program guide files that depict the material currently available to the user. A user can display the available material by rendering a particular HTML program guide file.

Conclusion

In accordance with the described invention, control of a plurality of devices (for example, a VCR, a CD player, a DVD player or any other device) is implemented with the aid of a single control loop, established from a video display of a client device (such as a TV or a PC) to a user, to a remote control device, to a detector (such as an IR detector) on the client device. Such a control loop is usable for controlling the plurality of devices, thereby eliminating a requirement for front panel controls on such devices. In one form of the invention, the control loop may be implemented by connecting the devices to a home network. Instead of using traditional front panel controls, the invention thus provides for control of such devices through the home network by interaction with the respective GUI thereof as rendered on the client device. The invention also eliminates a requirement for a remote control device to include therein, or to have access to, control codes specific to each of the devices on the network. In the illustrative embodiment described herein, the remote control device may fetch a GUI to provide the appropriate control function. In a modification, the remote control may include a display thereon for displaying the fetched GUI, thus eliminating a need for a separate display on a client device. The invention thus permits the remote control to access and control a plurality of devices using a single remote control and a single display, with a single method of display and operation, without requiring any change in the mode of operation thereof to change the device controlled thereby.

The foregoing description of the preferred embodiment of the invention has been presented for purposes of illustration and description. It is not intended to be exhaustive or to limit the invention to the precise forms disclosed, since many modifications or variations thereof are possible in light of the above teaching. All such modifications and variations are within the scope of the invention without departing from the broader spirit and scope of the invention. The embodiments described herein were chosen and described in order best to explain the principles of the invention and its practical application, thereby to enable others skilled in the art to utilize the invention in various embodiments and with various modifications as are suited to the particular use contemplated therefor. It is intended that the scope of the invention be defined by the claims appended hereto, when interpreted in accordance with the full breadth to which they are legally and equitably entitled. The specification and drawings are, accordingly, to be regarded in an illustrative rather than a restrictive sense.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. Control system for controlling a plurality of devices comprising:
  remote control for controlling said plural devices; the remote control including display means for displaying a device selection page to a user on said display means, said device selection page including respective display sections corresponding to each of said plural devices; and
  said remote control further including communicating means for communicating with a client device and for providing a control command thereto;
  wherein said client device controls at least one of said plural devices in response to said control command from said remote control to cause said at least one of said plural devices to perform a predetermined function corresponding to said control command from said remote control.

2. Control system in accordance with claim 1, said remote control further comprising selecting means for selecting one of said plural devices displayed in said device selection page and providing a selection command to said client device.

3. Control system for controlling a plurality of devices comprising:

remote control for controlling said plural devices; the remote control including display means for displaying a device selection page to a user on said display means, said device selection page including respective display sections corresponding to each of said plural devices; and said remote control further including communicating means for communicating with any one of said plural devices via a client device and for controlling said one of said plural devices to perform a predetermined function by providing a control command corresponding thereto to said client device;

wherein said client device receives said control command from said remote control and in response thereto provides a corresponding command to said one of said plural devices to cause said one of said plural devices to perform said predetermined function.

4. Control system in accordance with claim 3, wherein said client device selects one of said plural devices in response to said selection command from said remote control and displays a GUI for said selected one of said plural devices.

5. Control system for controlling a plurality of devices comprising:

remote control for controlling said plural devices; the remote control including display means for displaying a device selection page to a user on said display means, said device selection page including respective display sections corresponding to each of said plural devices; and said remote control further including communicating means for communicating with any one of said plural devices via a client device and for controlling said one of said plural devices by providing a control command for controlling said client device;

wherein said client device controls said one of said plural devices in response to said control command from said remote control to cause said at least one of said plural devices to perform a predetermined function corresponding to said control command from said remote control.

6. Control system in accordance with claim 5, wherein said client device responds to said control command by controlling said selected one of said plural devices.

* * * * *